United States Patent
Miyazaki et al.

(10) Patent No.: US 6,415,593 B1
(45) Date of Patent: Jul. 9, 2002

(54) METALLIC CORD AND PNEUMATIC TIRE

(75) Inventors: Shinichi Miyazaki, Kobe; Kazumi Yamazaki, Osaka; Yasuo Sakai, Utsunomiya, all of (JP)

(73) Assignees: Sumitomo Rubber Industries, Ltd., Hyogo-Ken; Sumitomo Electric Industries, Ltd., Osaka-Fu, both of (JP)

( * ) Notice: Subject to any disclaimer, the term of this patent is extended or adjusted under 35 U.S.C. 154(b) by 0 days.

(21) Appl. No.: 09/973,708

(22) Filed: Oct. 11, 2001

Related U.S. Application Data

(62) Division of application No. 09/363,046, filed on Jul. 29, 1999, now Pat. No. 6,332,310.

(30) Foreign Application Priority Data

| Jul. 29, 1998 | (JP) | 10-214116 |
| Jul. 29, 1998 | (JP) | 10-214117 |
| Jul. 30, 1998 | (JP) | 10-215560 |
| Jul. 30, 1998 | (JP) | 10-215561 |

(51) Int. Cl.[7] .............................................. D02G 3/02
(52) U.S. Cl. ........................................ 57/236; 57/902
(58) Field of Search .......................... 57/236, 200, 206, 57/212, 223, 227, 241, 242, 311, 902; 152/527

(56) References Cited

U.S. PATENT DOCUMENTS

| 4,644,989 A | * | 2/1987 | Charvet et al. | 57/236 |
| 4,938,015 A | * | 7/1990 | Kinoshita | 57/236 |
| 5,020,312 A | * | 6/1991 | Watakabe | 57/236 |
| 5,118,568 A | * | 6/1992 | Okamoto et al. | 57/236 |
| 5,135,039 A | | 8/1992 | Mizuta et al. | |
| 5,502,960 A | * | 4/1996 | Kobayashi et al. | 57/236 |
| 5,688,597 A | | 11/1997 | Kohno | |

FOREIGN PATENT DOCUMENTS

| DE | 39 28 424 A | 3/1990 | |
| EP | 0 841 430 | 5/1998 | |
| JP | 6241339 | * 2/1987 | 57/236 |

* cited by examiner

*Primary Examiner*—Danny Worrell
(74) *Attorney, Agent, or Firm*—Birch, Stewart, Kolasch & Birch, LLP

(57) ABSTRACT

A steel cord is formed by compactly twisting steel filaments together, the steel filaments including a plurality of zigzag filaments and optionally a nonzigzag filament, the zigzag filament being zigzaged two-dimensionally and made up of straight segments each extending between the zigzag peak points, the nonzigzag filament being straight. In case the cord is composed of only the zigzag filaments, the zigzag filaments include at least two kinds of zigzag filaments having different zigzag pitch lengths. In case the cord is composed of both the zigzag filaments and nonzigzag filaments, some of the zigzag and nonzigzag filaments are first loosely twisted together into a bunch, and then a plurality of bunches are twisted together into the cord. In any case, the zigzag pitch length and zigzag wave height of each zigzag filament are substantially constant along the length thereof. A Tire comprises a reinforcing layer such as a tread reinforcing belt layer, carcass, bead reinforcing layer and the like made of the above-mentioned steel cords.

3 Claims, 10 Drawing Sheets

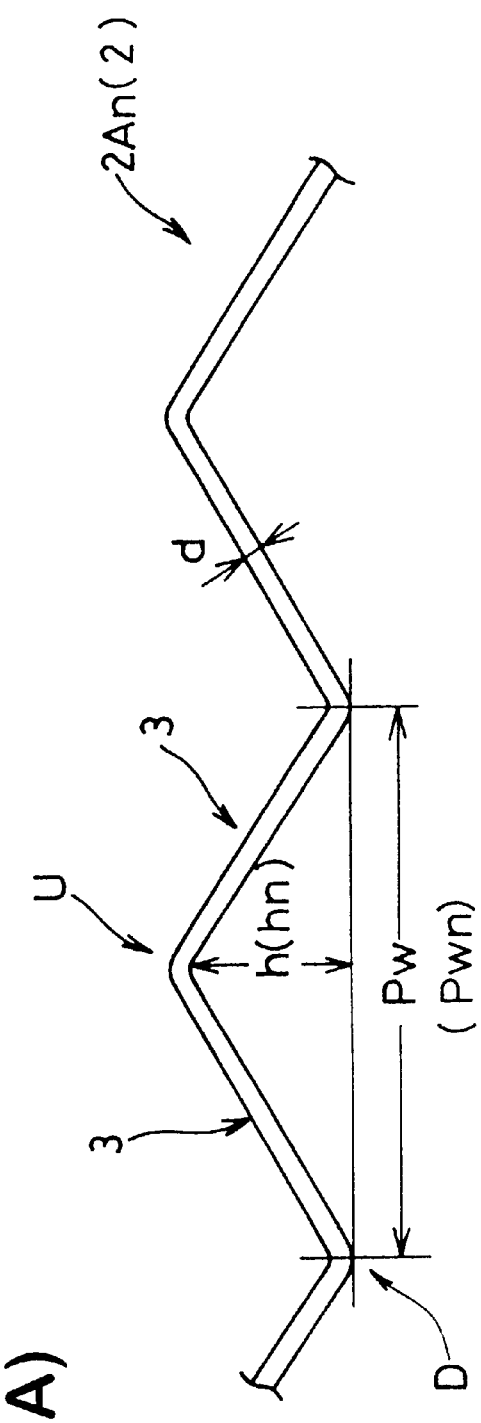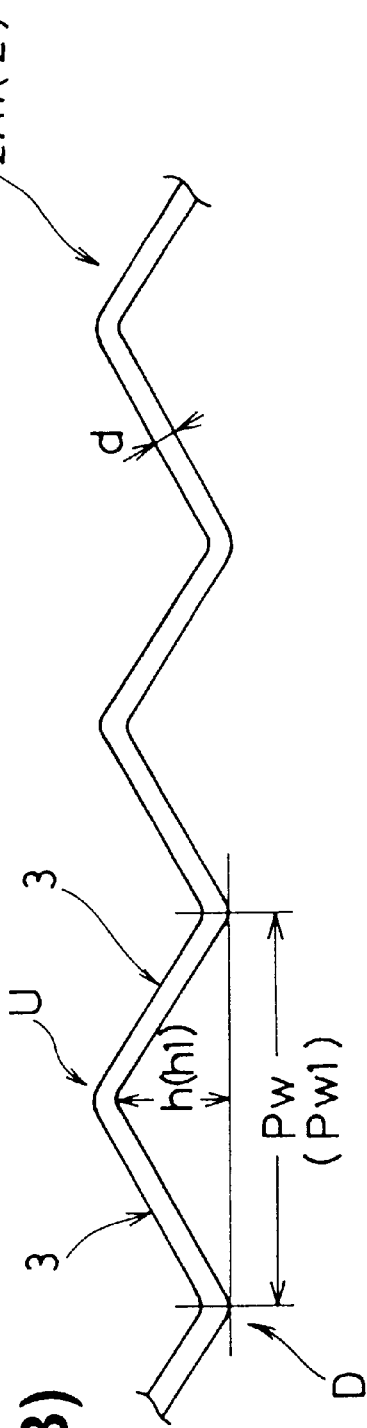
Fig.1(A)
Fig.1(B)

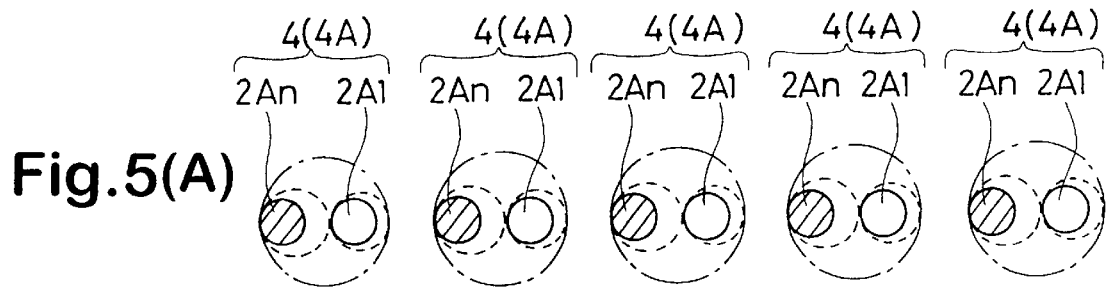
Fig.5(A)
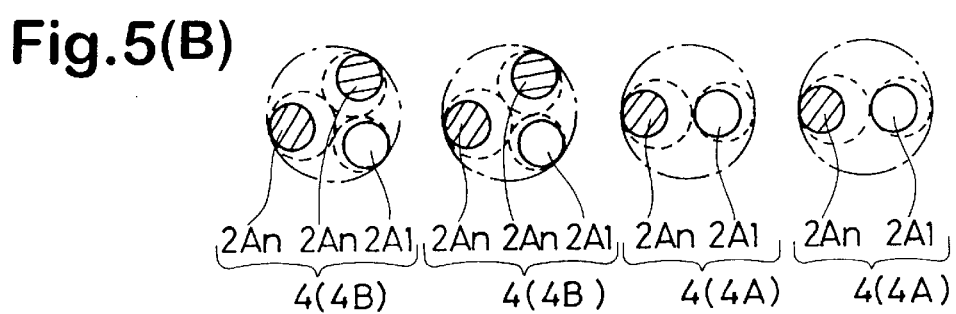
Fig.5(B)
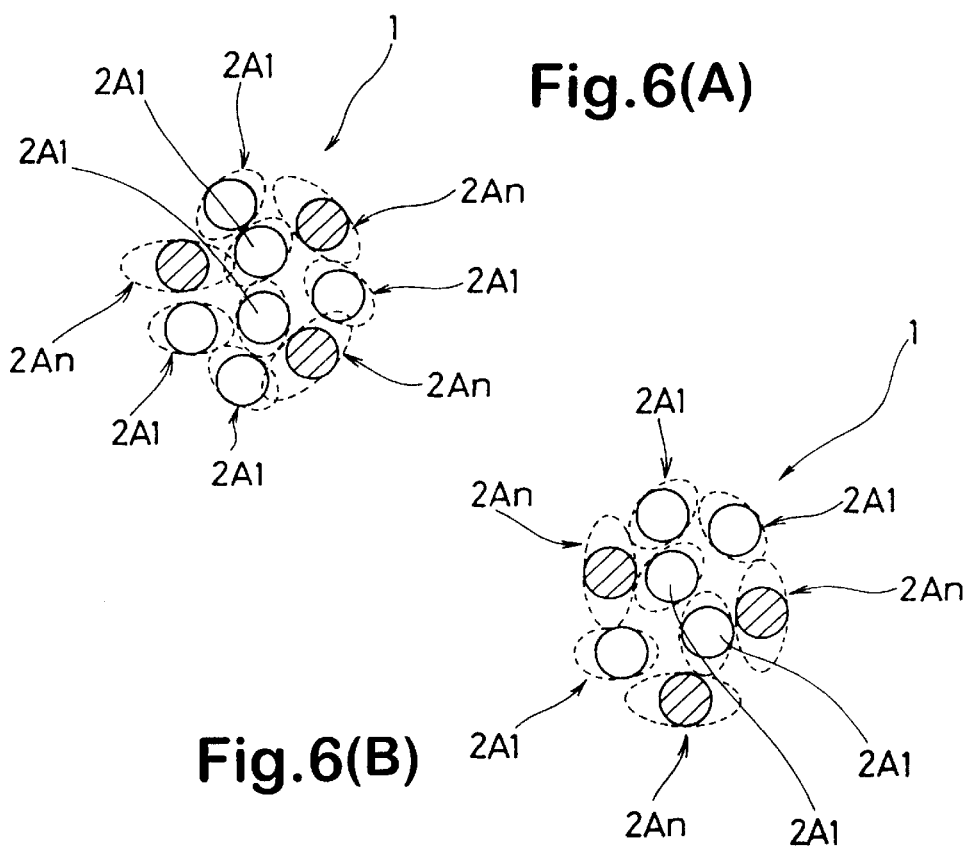
Fig.6(A)
Fig.6(B)

METALLIC CORD AND PNEUMATIC TIRE

This application is a divisional of application Ser. No. 09/363,046, filed on Jul. 29, 1999, now U.S. Pat. No. 6,332,310 the entire contents of which are hereby incorporated by reference and for which priority is claimed under 35 U.S.C. §120; and this application claims priority of Application Nos. 10-215560, 10-215561, 10-214116 and 10-214117 filed in Japan on Jul. 30, 1998, Jul. 30, 1998, Jul. 29, 1998 and Jul. 29, 1998, respectively, under 35 U.S.C. §119.

The present invention relates to a metallic cord for reinforcing rubber articles such as pneumatic tires in which penetration of rubber into the cord is improved.

Many rubber articles such as pneumatic tires and the like are generally reinforced with steel cords.

As shown in FIG. 15, a conventional steel cord is formed by compactly twisting straight steel filaments together. This type of steel cords however have a defect such that closed space not filled with rubber is formed among the filaments and steel filaments are liable to rust and adhesion between the cords and rubber becomes insufficient. As a result, the cord strength greatly decreases and the cord is broken finally.

Recently, in order to improve the penetration of rubber into cords to solve the above-mentioned problems, there have been proposed a steel cord (b) in which straight filaments (f) are loosely twisted as shown in FIG. 16, and a steel cord (c) in which spiral filaments (f1) and straight filaments (f2) are twisted as shown in FIG.

Such cords however, necessitate a relatively large cord diameter in order to secure stable rubber penetration. Further, such cords tend to show a large initial elongation. As a result, it is difficult to use the cords in order to reinforce a carcass and beads of pneumatic tires.

It is therefore, an object of the present invention to provide a steel cord in which the rubber penetration is improved without increasing the cord diameter and initial elongation.

According to the present invention, a steel cord is formed by compactly twisting steel filaments together, the steel filaments including a plurality of zigzag filaments and optionally a nonzigzag filament, the zigzag filament being zigzaged two-dimensionally and made up of straight segments each extending between the zigzag peak points, the nonzigzag filament being straight. In case the cord is composed of only the zigzag filaments, the zigzag filaments include at least two kinds of zigzag filaments having different zigzag pitch lengths. And at least two kinds of zigzag filaments are first loosely twisted together into a bunch, and then a plurality of bunches are twisted together into the cord. In case the cord is composed of both the zigzag filaments and nonzigzag filaments, some of the zigzag and nonzigzag filaments are first loosely twisted together into a bunch, and then a plurality of bunches are twisted together into the cord. In any case, the zigzag pitch length and zigzag wave height of each zigzag filament are substantially constant along the length thereof.

A tire comprises a reinforcing layer such as a tread reinforcing belt layer, carcass, bead reinforcing layer and the like made of the above-mentioned steel cords.

Embodiments of the present invention will now be described in detail in conjunction with the accompanying drawings.

FIG. 1(A) and FIG. 1(B) show zigzag filaments having different zigzag pitch lengths.

FIG. 2 is a schematic view for explaining a method of making a cord (Embodiment 1) according to the present invention.

FIG. 3(A) to FIG. 5(B) are cross sectional views each showing a combination of the number of filaments and the number of filament bunches in Embodiment 1.

FIG. 6(A) and FIG. 6(B) are cross sectional views each showing a cord (Embodiment 1) according to the present invention.

FIG. 9(R) to FIG. 10(D) are cross sectional views each showing a cord (Embodiment 2) according to the present invention.

Figure 11A:
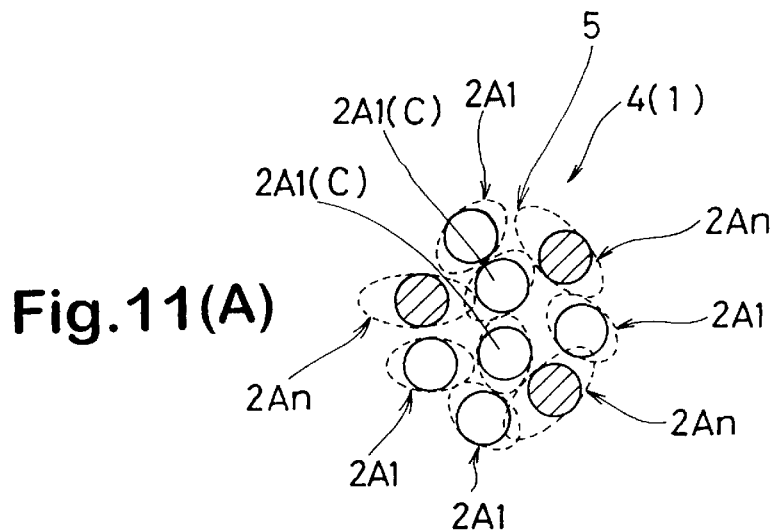
Figure 11B:
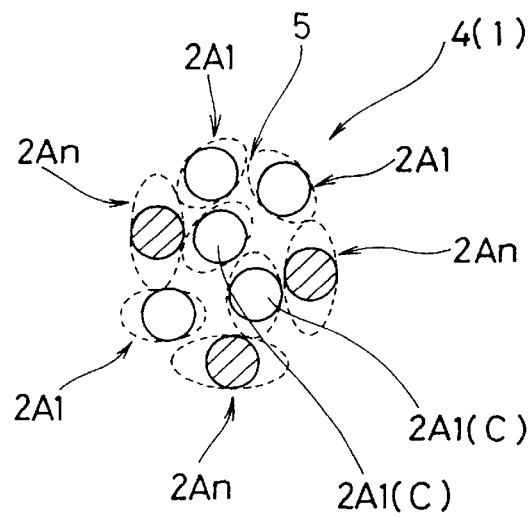

FIG. 11(A) and FIG. 11(B) are cross sectional views each showing a cord (Embodiment 3) according to the present invention.

Figure 12:
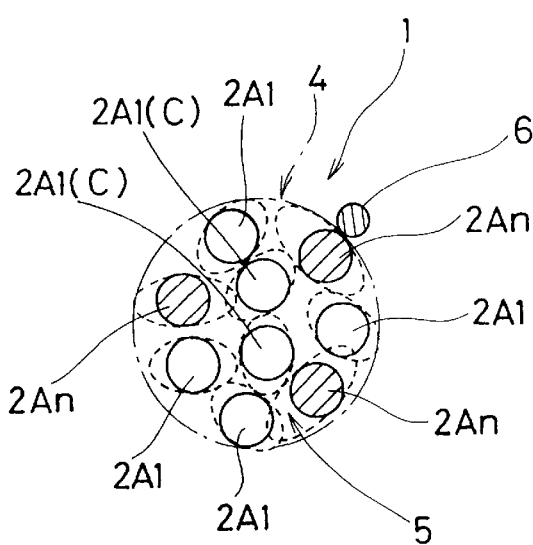

FIG. 12 is a cross sectional view showing a cord (Embodiment 4) according to the present invention.

Figure 13:
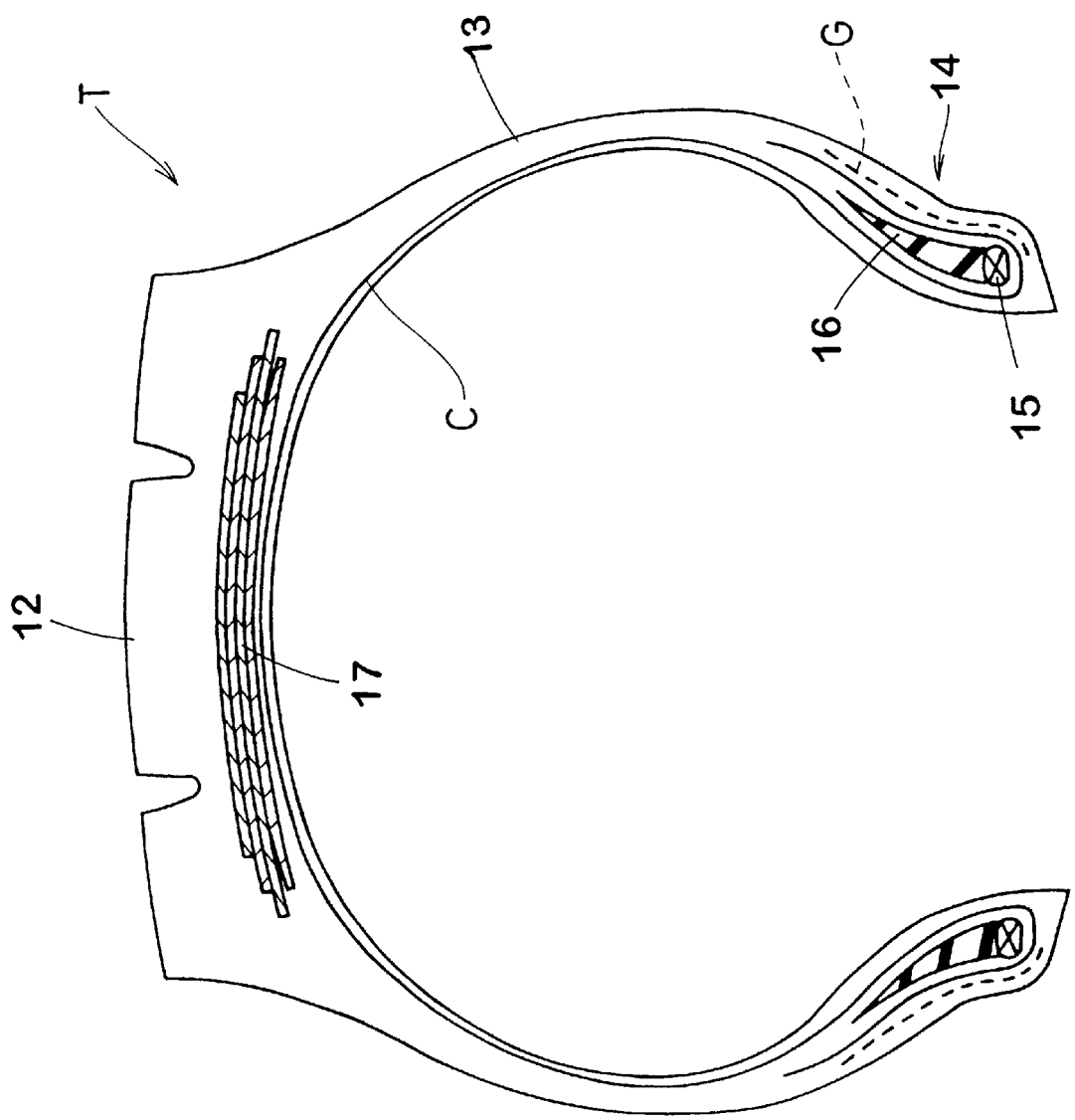

FIG. 13 is a cross sectional view showing a tire according to the present invention.

Figure 14:
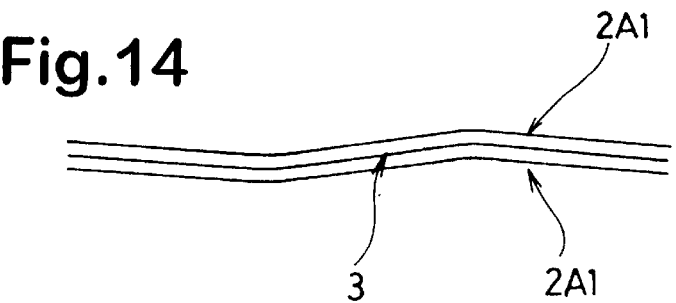

FIG. 14 is a diagram for explaining a coincidence of the zigzag phases of zigzag filaments.

Figure 15:
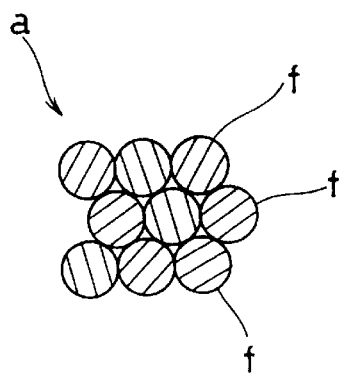

FIG. 15 is a cross sectional view of a conventional compact cord.

Figure 16:
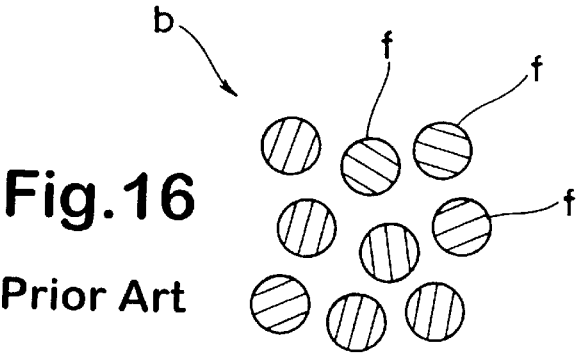

FIG. 16 is a cross sectional view of an open cord.

Figure 17:
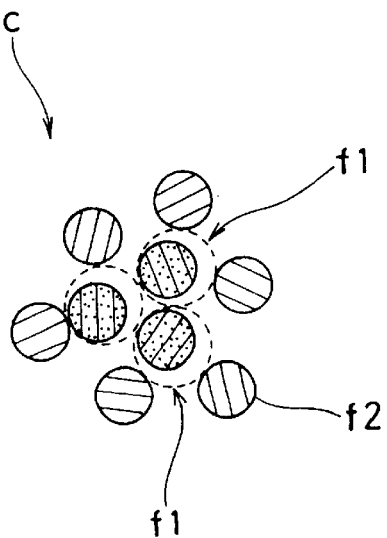

FIG. 17 is a cross sectional view of a cord comprising spiral filaments.

In the drawings, steel cords 1 according to the present invention are each formed by compactly twisting steel filaments 2 together.

The steel filaments 2 include a plurality of zigzag filaments 2A and optionally a nonzigzag filament 2B.

The zigzag filament 2A is, before twisted, zigzaged two-dimensionally or in a plane, and it is made up of straight segments 3 each extending between the zigzag peak points U and D (peak U, dip D) as shown in FIG. 1(A) and FIG. 1(B). The distance between the zigzag peak points (D and D) or (U and U) measured in the longitudinal direction of the filament defines a zigzag pitch length Pw. The distance between the adjacent peak points U and D measured normally to the longitudinal direction of the filament defines a zigzag wave height h.

On the other hand, the nonzigzag filament 2B is straight before twisted.

Preferably, the steel filaments 2 is made of a high carbon steel including 0.65 to 0.88 wt % of carbon. And the steel filaments are plated with a metal or coated with resin to improve the corrosion resistance and adhesion to rubber. If the carbon content is less than 0.65 wt %, the strength of the filament becomes insufficient. If the carbon content is more than 0.88 wt %, the strength of the filament is greatly decreased when bent zigzag.

When the cord 1 is composed of only the zigzag filaments 2A, the zigzag filaments 2 A should include at least two kinds of zigzag filaments 2A1–2An having different zigzag pitch lengths Pw in order to avoid the coincidence of the zigzag phases as shown in FIG. 14 which lowers the rubber penetration.

When the cord 1 is composed of both the zigzag filaments 2A and nonzigzag filaments 2B, some of the zigzag and nonzigzag filaments are first loosely twisted together into a bunch, and then a plurality of bunches are twisted together (last-twist) into the cord, whereby concentration of a cord load on the nonzigzag filaments 2B can be mitigated. Further, it becomes possible to form spaces between the filaments between the bunches and to avoid the coincidence of the zigzag phases, which further improve the rubber penetration. During last-twisting, it is preferable to twist every bunch itself. (hereinafter, bunch-twist)

In any case, the zigzag pitch lengths Pw and zigzag wave height h of each zigzag filament 2A are substantially constant along the length thereof. If a zigzag filament has a variable zigzag pitch and a variable zigzag wave height, the strength of the cord has a tendency to decrease.

* Cord Embodiment 1

This embodiment is designed for a belt reinforcing a tread portion of a pneumatic radial tire, which can be suitably used as a substitute for a conventional steel cord of a 3+9+15 construction widely used in heavy duty radial tires for trucks, buses and the like.

The cord 1 in this embodiment is composed of 8 to 10 zigzag filaments 2A having a diameter d of from 0.30 to 0.45 mm.

The zigzag filaments 2A include at least two kinds of zigzag filaments 2A1–2An having different zigzag pitch lengths Pw1–Pwn.

Figure 2:
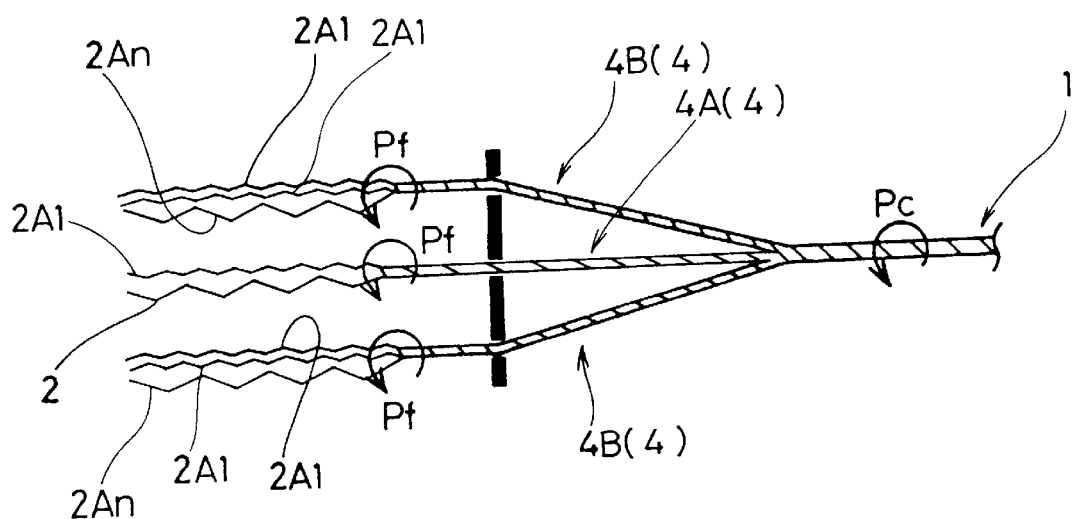

As shown in FIG. 2, the cord 1 is formed by twisting bunches 4 of filaments 2A together at a twist pitch Pc of 10 to 40 mm (last twist).

Each bunch 4 is formed by twisting together two or three zigzag filaments 2A including at least two kinds of zigzag filaments 2A1 and 2An at a twist pitch Pf of 3 to 20 times the pitch Pc of the last twist.

In each zigzag filament 2A, the filament diameter d, zigzag pitch lengths Pw and zigzag wave height h are set to satisfy the following conditions: Pw is 5.0 to 30.0 times d; h is 0.2 to 3.0 times d; and d X h/Pw is 0.014 to 0.028 preferably 0.020 to 0.025.

FIGS. 3(A) to FIG. 5(B) show preferable combinations of the number of bunches 4 and the number of filaments 2A.

Figure 3A:
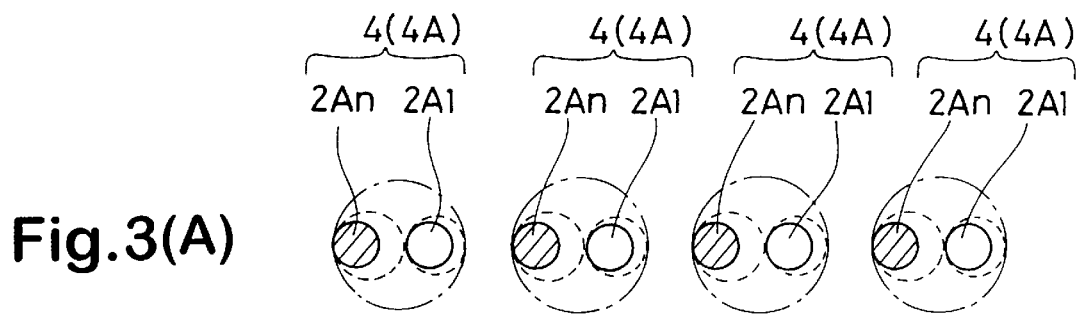

In FIG. 3(A), the cord is composed of four bunches 4A of one zigzag filament 2A1 and one zigzag filament 2An.

Figure 3B:
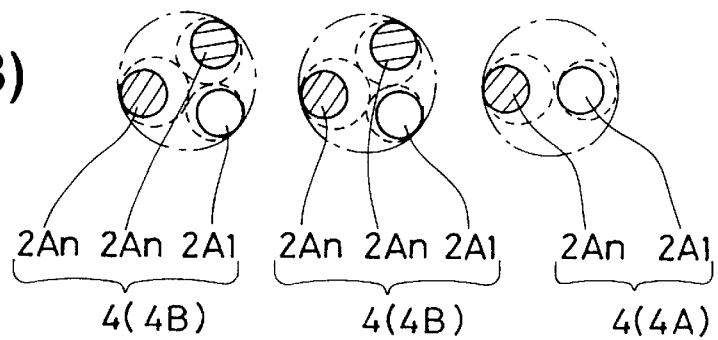

FIG. 3(B), the cord is composed of two bunches 4B of one zigzag filament 2A1 and two zigzag filaments 2An and one bunch 4A of one zigzag filament 2A and one zigzag filament 2An.

Figure 4A:
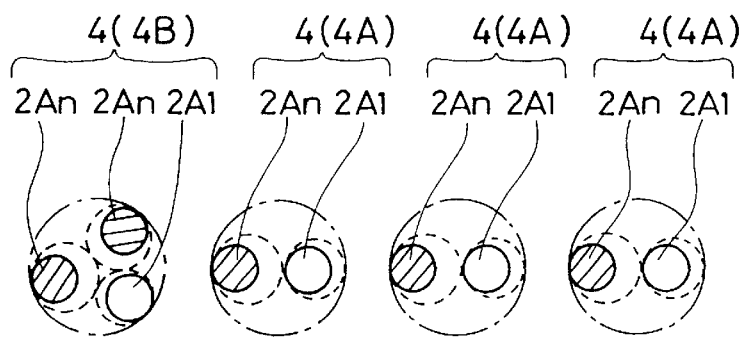

In FIG. 4(A), the cord is composed of one bunch 4B of one zigzag filament 2A1 and two zigzag filaments 2An and three bunches 4A of one zigzag filament 2A1 and one zigzag filament 2An.

Figure 4B:
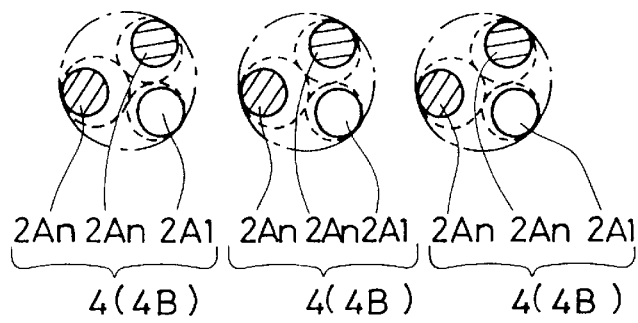

In FIG. 4(B), the cord is composed of three bunches 4B of one zigzag filament 2A1 and two zigzag filaments 2An.

In FIG. 5(A), the cord is composed of five bunches 4A of one zigzag filament 2A1 and one zigzag filament 2An.

In FIG. 5(B), the cord is composed of two bunches 4B of one zigzag filament 2A1 and two zigzag filaments 2An and two bunches 4A of one zigzag filament 2A1 and one zigzag filament 2An.

Further, FIG. 6(A) shows a cross sectional view of a cord composed of six zigzag filament 2A1 and three zigzag filaments 2An.

FIG. 6(B) shows a cross sectional view of a cord composed of five zigzag filament 2A1 and three zigzag filaments 2An.

In the above-mentioned examples shown in FIG. 3(A) to FIG. 5(B), the type (B) is more preferable than the type (A) because two or more bunches 4B of three filaments are included therein.

In the illustrated examples, the direction of twisting the filaments is the same as the direction of twisting the bunches. However, it is also possible to twist in the reverse direction. Further, all the filaments 2A are the same diameter d, but, they may have two or more different diameters. With respect to the zigzag pitch length Pw and zigzag wave height h, the zigzag filament 2An is larger than the zigzag filaments 2A1.

If the diameter d is less than 0.30 mm, it becomes difficult to obtain a rigidity required for a belt layer of the heavy duty tires, and the zigzag shape is apt to return to a straight shape during twisting, and the rubber penetration decreases. If the diameter d is more than 0.45 mm, the strength of the filament tends to decrease when shaped into a zigzag, and a suppleness required during making tires is lost.

If the twist pitch Pf is less than 3 times the last twist pitch Pc, the spaces formed between the filaments becomes narrow and the rubber penetration decreases. If the twist pitch Pf is more than 20 times the last twist pitch Pc, the zigzag phases are liable to coincide with each other and the rubber penetration decreases.

It is not necessary for improving the rubber penetration to shorten the twist pitch, and a relatively long pitch 10 to 40 mm can be employed. Thus, the production efficiency of the cord can be improved.

If the zigzag pitch length Pw is less than 5.0 times the diameter d, the strength of the filament tends to decrease when shaped into a zigzag. If more than 30 times, the rubber penetration decreases.

If the zigzag wave height h is less than 0.2 times the diameter d, it becomes difficult to increase the rubber penetration. If more than 3.0 times, the strength of the filament tends to decrease when shaped into a zigzag.

Figure 7:
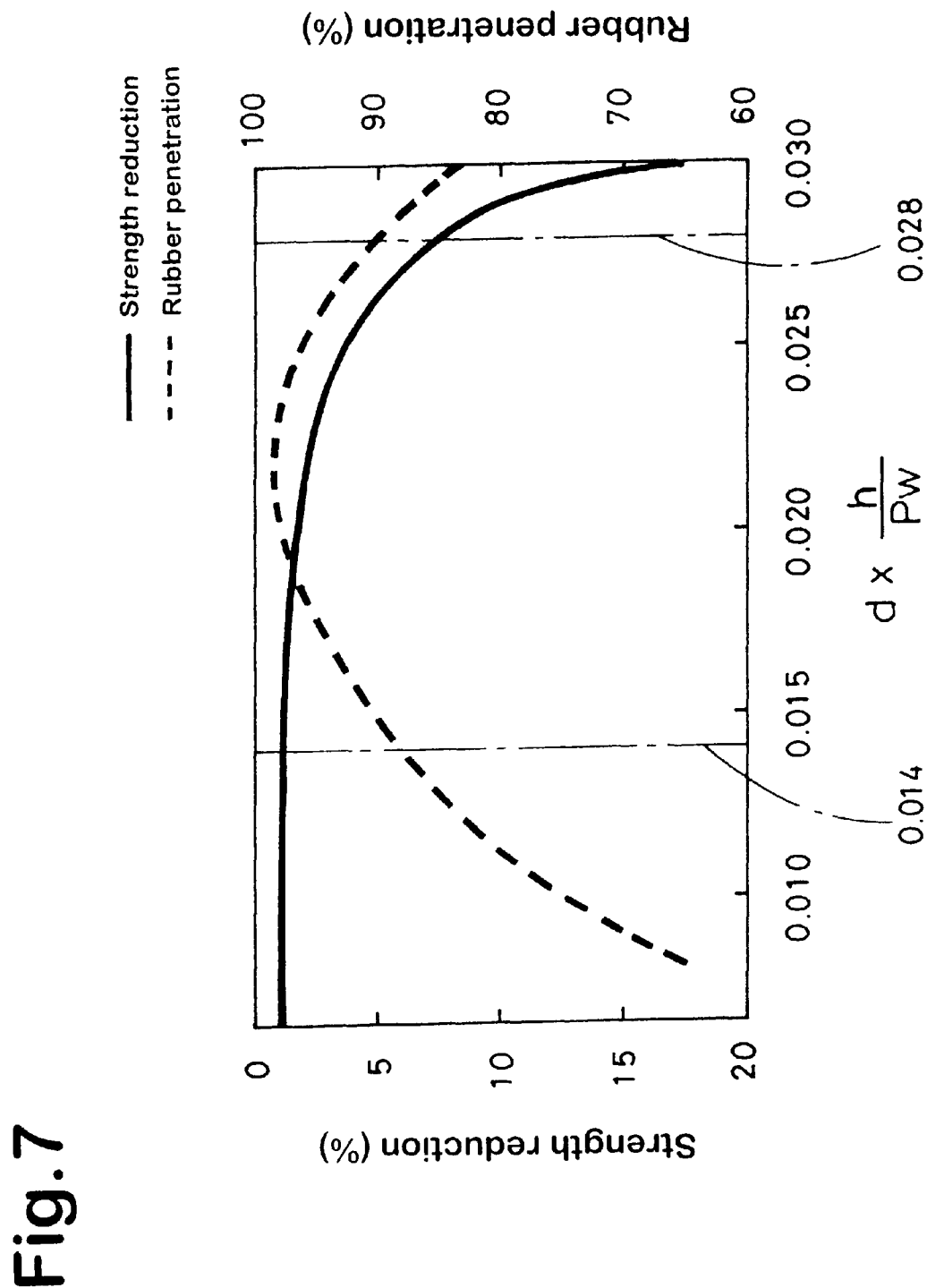
FIG. 7 is a graph showing a cord strength reduction and rubber penetration as a function of dXh/Pw value.

FIG. 7 shows the cord strength reduction (%) and rubber penetration (%) as a function of the dXh/Pw value. As can be seen therefrom, by setting dXh/Pw in the range of 0.014 to 0.028 more preferably 0.020 to 0.025, both the rubber penetration and cord strength are improved.

* Comparison Tests

Various experimental steel cords were made, and test tires having a belt layer made of the experimental cords were also made, and the following comparison tests were conducted. The results of the tests are shown in Table 1.

* Cord Strength Reduction

In this test, a reduction (%) in the strength of an object Ad cord (Ex.) from a conventional compact cord (Ref.) was obtained, wherein the object cord and the compact cord were the same with respect to the material, number of filaments and last-twist pitch, but the compact cord is composed of nonzigzag filaments only.

* Bending Rigidity

The bending rigidity of each cord was measured with a TABER "V-5 Rigidity Tester" (USA).

* Rubber Penetration

The cord was took out from the tire together with the surrounding topping rubber, and the topping rubber was carefully removed from the surface of the cord. Then, adjacent two filaments were took out therefrom along 10 cm long using a knife, and the length of a part surrounded by the two took-out filaments and the remaining filaments into which the rubber completely penetrated was measured to obtain the percentage of this length to the total length of 10 cm as the rubber penetration %.

* Rust and Reserved Strength

The tire was disassembler after running about 200,00 km, and the steel cords were checked for rust. The results are indicated by an index based on the conventional cord being 100. The smaller the index, the smaller the rust.

Further, the steel cords were took out and the cord strength was measured. The results are indicated in percentage to the original strength.

TABLE 1

|  | Ref. A1 | Ref. A2 | Ref. A3 | Ref. A4 | Ref. A5 | Ref. A6 | Ref. A7 | Ref. A8 |
|---|---|---|---|---|---|---|---|---|
| Filament diameter (mm) | 0.38 | 0.38 | 0.38 | 0.38 | 0.38 | 0.38 | 0.38 | 0.38 |
| Number of filaments | 9 | 9 | 9 | 9 | 9 | 9 | 9 | 9 |
| Zigzag filament | 0 | 5 | 0 | 9 | 9 | 9 | 9 | 9 |
| Straight filament | 9 | 4 | 0 | 0 | 0 | 0 | 0 | 0 |
| Spiral filament | 0 | 0 | 9 | 0 | 0 | 0 | 0 | 0 |
| Wave height h (mm) | — | 0.28 | 0.45 | 0.4 | 0.50/0.40 | 0.35/0.28 | 0.35/0.28 | 0.35/0.30 |
| Wave pitch Pw (mm) | — | 5 | 5 | 5 | 6.30/5.00 | 6.30/5.00 | 6.30/5.00 | 1.50/1.30 |
| dXh/Pw | — | 0.021 | 0.034 | 0.03 | 0.030/0.030 | 0.021/0.021 | 0.021/0.021 | 0.089/0.088 |
| Number of respective filaments | — | 5 | 9 | 9 | 3/6 | 3/6 | 3/6 | 3/6 |
| Structure *1 | — | (5.0*2 + 0*1)*2 + (5.0*1 + 0*2)*1 | — | — | (6.3*1 + 5.0*1)*3 | (6.3*1 + 5.0*2)*3 | (6.3*1 + 5.0*2)*3 | (1.5*1 + 1.3*2)*3 |
| Last twist pitch (mm) | 18 | 18 | 18 | 18 | 18 | 8 | 50 | 18 |
| Bunch Twist | yes | yes | yes | yes | yes | yes | yes | yes |
| Carbon content (%) | 0.82 | 0.82 | 0.82 | 0.82 | 0.82 | 0.82 | 0.82 | 0.82 |
| Cord characteristics |  |  |  |  |  |  |  |  |
| Diameter (mm) | 1.4 | 1.42 | 1.53 | 1.43 | 1.45 | 1.46 | 1.42 | 1.44 |
| Strength (N/sq.mm) | 3013 | 2630 | 2980 | 2561 | 2570 | 2953 | 2970 | 2420 |
| Strength reduction (%) | 0 | 12.7 | 2.3 | 15 | 14.7 | 2 | 1.4 | 19.7 |
| Elongation @ 50N (%) | 0.052 | 0.057 | 0.293 | 0.057 | 0.059 | 0.132 | 0.049 | 0.173 |
| Cord bending rigidity (N cm) | 260 | 257 | 249 | 254 | 252 | 256 | 256 | 256 |
| Tire performance |  |  |  |  |  |  |  |  |
| Rubber penetration (%) | 0 | 69 | 83 | 72 | 90 | 95 | 89 | 95 |
| Rust (index) | 100 | 49 | 32 | 43 | 12 | 10 | 25 | 10 |
| Reserved strength (%) | 86 | 91 | 92 | 93 | 98 | 98 | 94 | 98 |

|  | Ref. A9 | Ref. A10 | Ref. A11 | Ex. A1 | Ex. A2 | Ex. A3 | Ex. A4 |
|---|---|---|---|---|---|---|---|
| Filament diameter (mm) | 0.38 | 0.38 | 0.38 | 0.38 | 0.38 | 0.38 | 0.38 |
| Number of filaments | 9 | 9 | 9 | 9 | 9 | 9 | 9 |
| Zigzag filament | 9 | 9 | 9 | 9 | 9 | 9 | 9 |
| Straight filament | 0 | 0 | 0 | 0 | 0 | 0 | 0 |
| Spiral filament | 0 | 0 | 0 | 0 | 0 | 0 | 0 |
| Wave height h (mm) | 0.35/0.30 | 0.06/0.05 | 1.40/1.20 | 0.35/0.28 | 0.35/0.28 | 0.35/0.28 | 0.35/0.28 |
| Wave pitch Pw (mm) | 13.0/12.0 | 6.30/5.40 | 6.30/5.00 | 6.30/5.00 | 6.30/5.00 | 6.30/5.00 | 6.30/5.00 |
| dXh/Pw | 0.010/0.010 | 0.004/0.004 | 0.084/0.084 | 0.021/0.021 | 0.021/0.021 | 0.021/0.021 | 0.021/0.021 |
| Number of respective filaments | 3/6 | 3/6 | 3/6 | 3/6 | 3/6 | 3/6 | 3/6 |
| Structure *1 | (13.0*1 + 12.0*2)*3 | (6.3*1 + 5.0*2)*3 | (6.3*1 + 5.4*2)*3 | (6.3*1 + 5.0*2)3* | (6.3*1 + 5.0*2)*3 | (6.3*1 + 5.0*2)*3 | (6.3*1 + 5.0*2)*3 |
| Last twist pitch (mm) | 18 | 18 | 18 | 18 | 35 | 12 | 18 |
| Bunch Twist | yes | yes | yes | yes | yes | yes | yes |
| Carbon content (%) | 0.82 | 0.82 | 0.82 | 0.82 | 0.82 | 0.82 | 0.65 |
| Cord characteristics |  |  |  |  |  |  |  |
| Diameter (mm) | 1.43 | 1.41 | 1.44 | 1.43 | 1.41 | 1.45 | 1.43 |
| Strength (N/sq.mm) | 2965 | 2970 | 2530 | 2953 | 2967 | 2938 | 2658 |
| Strength reduction (%) | 1.6 | 1.4 | 16 | 2 | 1.5 | 2.4 | 1.3 |
| Elongation @ 50N (%) | 0.054 | 0.053 | 0.199 | 0.057 | 0.054 | 0.071 | 0.057 |
| Cord bending rigidity (N cm) | 256 | 256 | 256 | 256 | 258 | 242 | 255 |
| Tire performance |  |  |  |  |  |  |  |
| Rubber penetration (%) | 55 | 43 | 95 | 95 | 93 | 96 | 95 |
| Rust (index) | 54 | 62 | 10 | 10 | 15 | 9 | 10 |
| Reserved strength (%) | 89 | 88 | 98 | 98 | 97 | 98 | 99 |

|  | Ex. A5 | Ex. A6 | Ex. A7 | Ref. A12 | Ref. A13 | Ref. A14 | Ex. A8 | Ref. A15 |
|---|---|---|---|---|---|---|---|---|
| Filament diameter (mm) | 0.38 | 0.38 | 0.38 | 0.25 | 0.50 | 0.30 | 0.30 | 0.45 |
| Number of filaments | 9 | 9 | 9 | 9 | 9 | 9 | 9 | 9 |
| Zigzag filament | 9 | 9 | 9 | 9 | 9 | 0 | 9 | 0 |
| Straight filament | 0 | 0 | 0 | 0 | 0 | 9 | 0 | 9 |
| Spiral filament | 0 | 0 | 0 | 0 | 0 | 0 | 0 | 0 |
| Wave height h (mm) | 0.35/0.28 | 0.42/0.35 | 0.60/0.51 | 0.35/0.28 | 0.35/0.28 | — | 0.37/0.24 | — |
| Wave pitch Pw (mm) | 6.30/5.00 | 8.00/6.30 | 11.00/9.60 | 6.30/5.00 | 6.30/5.00 | — | 5.00/3.30 | — |
| dXh/Pw | 0.021/0.021 | 0.020/0.021 | 0.021/0.020 | 0.021/0.021 | 0.021/10.021 | — | 0.022/0.022 | — |
| Number of respective filaments | 3/6 | 3/6 | 3/6 | 3/6 | 3/6 | — | 3/6 | — |
| Structure *1 | (6.3*1 + 5.0*2)*3 | (8.0*1 + 6.3*2)*3 | (11.0*1 + 9.6*2)*3 | (6.3*1 + 5.0*2)*2 | (6.3*1 + 5.0*2)*2 | — | (5.0*1 + 3.3*2)*3 | — |
| Last twist pitch (mm) | 18 | 18 | 18 | 18 | 18 | 18 | 18 | 18 |
| Bunch Twist | yes | yes | yes | yes | yes | yes | yes | yes |
| Carbon content (%) | 0.88 | 0.82 | 0.82 | 0.82 | 0.82 | 0.82 | 0.82 | 0.82 |

TABLE 1-continued

| Cord characteristics | | | | | | | | |
|---|---|---|---|---|---|---|---|---|
| Diameter (mm) | 1.43 | 1.45 | 1.43 | 0.94 | 1.88 | 1.1 | 1.12 | 1.68 |
| Strength (N/sq.mm) | 3148 | 2968 | 2972 | 2993 | 2552 | 3032 | 2975 | 2972 |
| Strength reduction (%) | 2.4 | 1.5 | 1.4 | 1.8 | 14.3 | 0 | 2.2 | 0 |
| Elongation @ 50N (%) | 0.055 | 0.059 | 0.064 | 0.057 | 0.038 | 0.078 | 0.081 | 0.041 |
| Cord bending rigidity (N cm) | 256 | 252 | 256 | 47 | 749 | 101 | 98 | 500 |
| Tire performance | | | | | | | | |
| Rubber penetration (%) | 95 | 93 | 95 | 83 | 95 | 0 | 94 | 0 |
| Rust (index) | 11 | 14 | 11 | 34 | 10 | 100 | 13 | 100 |
| Reserved strength (%) | 99 | 98 | 99 | 91 | 98 | 86 | 97 | 86 |

| | Ex. A9 | Ref. A16 | Ex. A10 | Ref. A17 | Ex. A11 | Ex. A12 | Ex. A13 |
|---|---|---|---|---|---|---|---|
| Filament diameter (mm) | 0.45 | 0.38 | 0.38 | 0.38 | 0.38 | 0.38 | 0.30 |
| Number of filaments | 9 | 8 | 8 | 10 | 10 | 9 | 9 |
| Zigzag filament | 9 | 0 | 8 | 0 | 10 | 9 | 9 |
| Straight filament | 0 | 8 | 0 | 10 | 0 | 0 | 0 |
| Spiral filament | 0 | 0 | 0 | 0 | 0 | 0 | 0 |
| Wave height h (mm) | 0.37/0.29 | — | 0.35/0.28 | — | 0.35/0.28 | 0.35/0.28 | 0.37/0.24 |
| Wave pitch Pw (mm) | 8.00/6.30 | — | 6.30/5.00 | — | 6.30/5.00 | 6.30/5.00 | 5.00/3.30 |
| dXh/Pw | 0.021/0.021 | — | 0.021/0.021 | — | 0.021/0.021 | 0.021/0.021 | 0.022/0.022 |
| Number of respective filaments | 3/6 | — | 3/5 | — | 4/6 | 3/6 | 3/6 |
| Structure *1 | (8.0*1 + 6.3*2)*3 | — | (6.3*1 + 5.0*2)*2 (6.3*1 + 5.0*1)*1 | — | (6.3*1 + 5.0*2)*2 (6.3*1 + 5.0*1)*2 | (6.3*1 + 5.0*2)*3 | (5.0*1 + 3.3*2)*3 |
| Last twist pitch (mm) | 18 | 18 | 18 | 18 | 18 | 18 | 18 |
| Bunch Twist | yes | yes | yes | yes | yes | no | no |
| Carbon content (%) | 0.82 | 0.82 | 0.82 | 0.82 | 0.82 | 0.82 | 0.82 |
| Cord characteristics | | | | | | | |
| Diameter (mm) | 1.7 | 1.31 | 1.33 | 1.53 | 1.59 | 1.48 | 1.17 |
| Strength (N/sq.mm) | 2772 | 3013 | 2943 | 3013 | 2953 | 2926 | 2941 |
| Strength reduction (%) | 6.7 | 0 | 2.3 | 0 | 2 | 2.9 | 3 |
| Elongation @ 50N (%) | 0.044 | 0.057 | 0.06 | 0.05 | 0.055 | 0.069 | 0.089 |
| Cord bending rigidity (N cm) | 496 | 229 | 225 | 285 | 281 | 232 | 96 |
| Tire performance | | | | | | | |
| Rubber penetration (%) | 95 | 0 | 95 | 0 | 96 | 92 | 91 |
| Rust (index) | 11 | 100 | 9 | 100 | 10 | 16 | 17 |
| Reserved strength (%) | 97 | 86 | 97 | 86 | 97 | 96 | 96 |

*1) For example, (5.0*2+0*1)*2+(5.0*1+0*2)*1 means two bunches of two zigzag filaments whose Pw=5.0 and one straight filament (Pw=0) and one bunch of one zigzag filament whose Pw=5.0 and two straight filaments (Pw=0). (6.3*1+5.0*1)*3 means three bunches of one zigzag filament whose Pw=6.3 and one zigzag filament whose Pw=5.0.

All the cords had a twist pitch Pf of 10 times the last twist pitch Pc. The direction of twisting filaments into a bunch was the same as the last twist. Ref. A1, A14, A15, A16 A17 were conventional cords composed of compactly twisted straight filaments. Ref. A3 was composed of only spiral filaments. Ref. A4 was composed of one kind of zigzag filaments twisted together without forming any bunch.

* Cord Embodiment 2

This embodiment is again designed for a belt reinforcing a tread portion of a pneumatic radial tire, which can be suitably used as a substitute for a conventional steel cord of a 3+6 or 2+7 construction widely used in heavy duty radial tires for trucks, buses and the like.

The cord in this embodiment is composed of a number (n) of steel filaments 2 having a diameter d of 0.25 to 0.45 mm, wherein the number n is 5 or 6.

The steel filaments 2 include at least two but at most (n--3) of zigzag filaments 2A and the remaining two or three nonzigzag filaments 2B.

All the zigzag filaments 2A are the substantially same zigzag pitch length Pw and same zigzag wave height h.

Further, in the illustrated examples, all the steel filaments are the same diameter d.

When a steel filament having a relatively large diameter such as this embodiment is shaped into a zigzag, the strength of the filament tends to decrease. Thus, in this embodiment, in order to provide a strong cord, some of the zigzag filaments are replaced by straight filaments.

Figure 8:
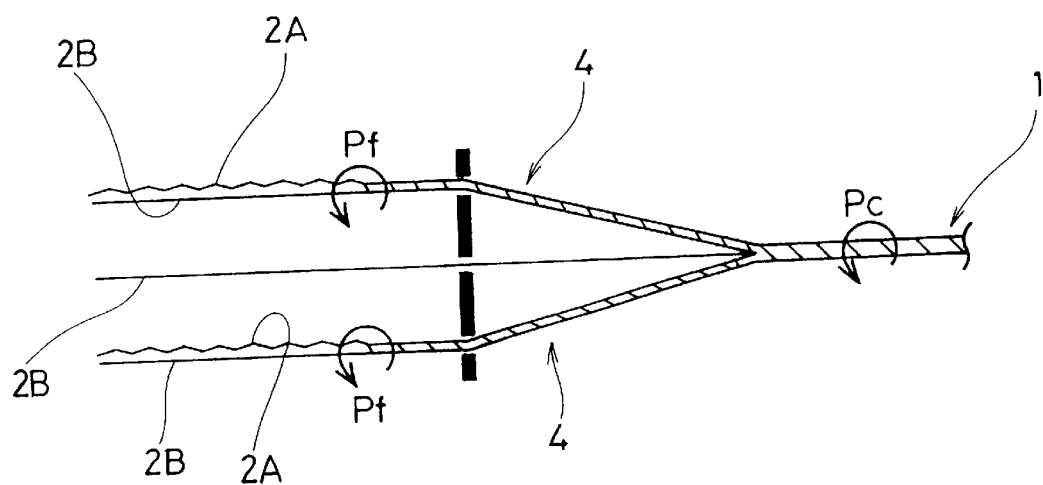
FIG. 8 is a schematic view for explaining a method of making a cord (Embodiment 2) according to the present invention.

The cord 1 is formed by twisting together:
(A) a plurality of bunches 4 of filaments or
(B) a nonzigzag filaments 2B and a plurality of bunches 4 of filaments as shown in FIG. 8.

In either case (A) or (B), each bunches 4 is formed by twisting together one zigzag filament 2A and one or two nonzigzag filaments 2B at a twisting pitch Pf of 3 to 20 times the last-twisting pitch Pc. The last-twisting pitch Pc is in the range of from 10 to 25 mn. The direction of twisting the filaments into a bunch is the same as the last-twisting direction, but it may be reversed.

In this embodiment, also the diameter d, zigzag pitch lengths Pw and zigzag wave height h in each zigzag filament 2A satisfy the following conditions: Pw is 5.0 to 30.0 times d, preferably 10.0 to 25.0 times d; h is 0.2 to 3.0 times d, preferably 0.5 to 2.0 times d; and dXh/Pw is 0.014 to 0.028, preferably 0.020 to 0.025.

Figure 9A:
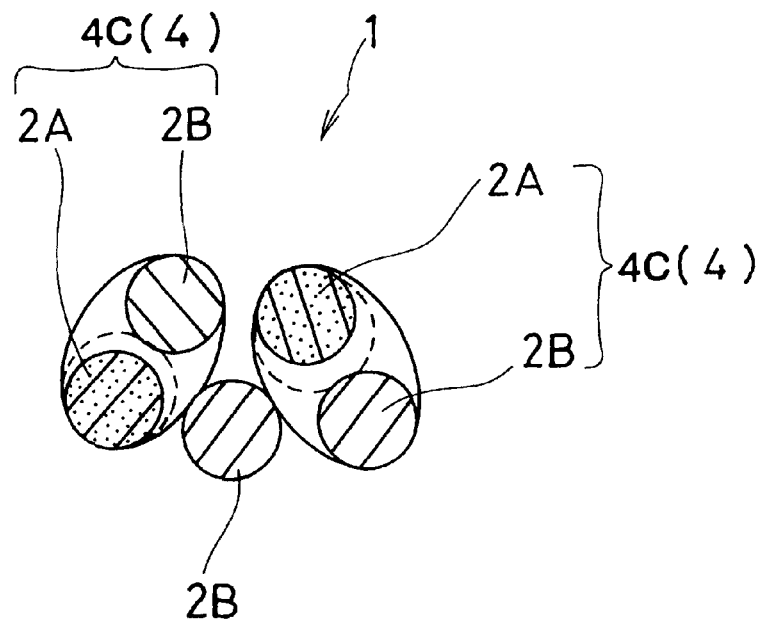

FIG. 9(A) shows a cord formed by last-twisting one nonzigzag filament 2B and two bunches 4C of one zigzag filament 2A and one nonzigzag filament 2B.

Figure 9B:
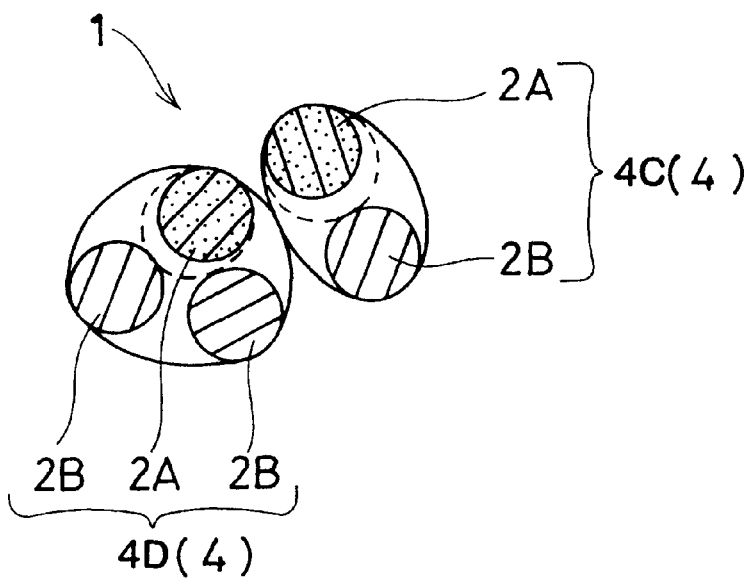

FIG. 9(B) shows a cord formed by last twisting one bunch 4C of one zigzag filament 2A and one nonzigzag filament 2B and one bunch 4D of one zigzag filament 2A and two nonzigzag filaments 2B.

Figure 10C:
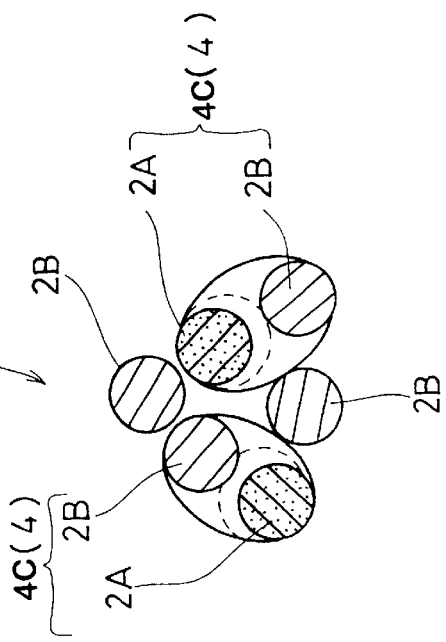
Figure 10D:
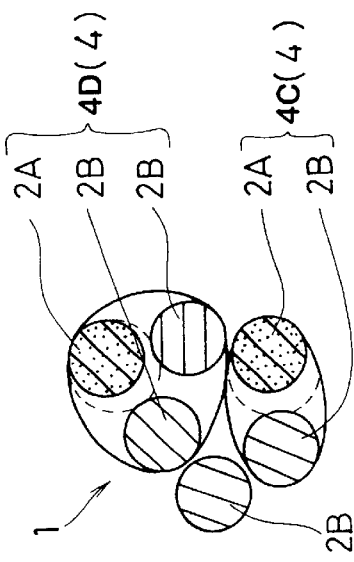
Figure 10A:
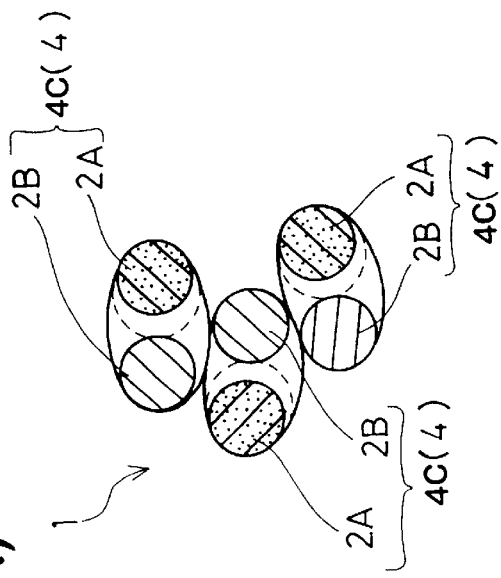

FIG. 10(A) shows a cord formed by last twisting three bunches 4C.

Figure 10B:
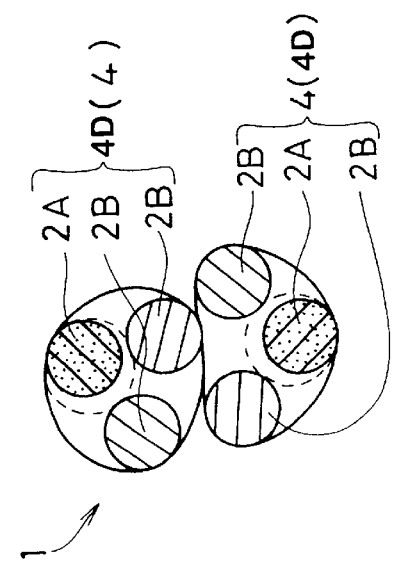

FIG. 10(B) shows a cord formed by last twisting two bunches 4D.

FIG. 10(C) shows a cord formed by last twisting two bunches 4C and two nonzigzag filaments 2B.

FIG. 10(D) shows a cord formed by last twisting one bunch 4C, one bunch 4D and one nonzigzag filament 2B.

In each of the example cords, all the filaments are the same diameter, but may have two or more different diameters.

If the diameter d is less than 0.25 mm, it becomes difficult to obtain a rigidity required for a belt layer of the heavy duty tires, and the zigzag shape is apt to return to a straight shape during twisting, and the rubber penetration decreases. If the diameter d is more than 0.45 mm, the strength of the filament tends to decrease when shaped into a zigzag, and a suppleness required during making tires is lost.

If the twist pitch Pf is less than 3 times the last twist pitch Pc, the spaces formed between the filaments becomes narrow and the rubber penetration decreases. If the twist pitch Pf is more than 20 times the last twist pitch Pc, the zigzag phases are liable to coincide with each other and the rubber penetration decreases.

It is not necessary for improving the rubber penetration to shorten the twist pitch, and a relatively long pitch 10 to 25 mm can be employed. Thus, the production efficiency of the cord can be improved.

If the zigzag pitch length Pw is less than 5.0 times the diameter d, the strength of the filament tends to decrease when shaped into a zigzag. If more than 30 times, the rubber penetration decreases.

If the zigzag wave height h is less than 0.2 times the diameter d, it becomes difficult to increase the rubber penetration. If more than 3.0 times, the strength of the filament tends to decrease when shaped into a zigzag.

* Comparison Tests

Various experimental steel cords were made, and test tires having a belt layer made of the experimental cords were also made, and the following comparison tests were conducted. The results of the tests are shown in Table 2.

* Cord Strength Reduction Test
    Same as above.
* Bending Rigidity Test
    Same as above.
* Rubber Penetration Test
    Same as above.
* Rust and Reserved Strength Test
    Same as above.

TABLE 2

|  | Ref.B1 | Ref.B2 | Ref.B3 | Ref.B4 | Ref.B5 | Ref.B6 | Ex.B1 | Ex.B2 | Ex.B3 | Ex.B4 | Ex.B5 | Ex.B6 |
|---|---|---|---|---|---|---|---|---|---|---|---|---|
| Filament diameter (mm) | 0.38 | 0.38 | 0.38 | 0.38 | 0.38 | 0.38 | 0.38 | 0.38 | 0.38 | 0.38 | 0.38 | 0.38 |
| Number of filaments | 5 | 5 | 5 | 5 | 5 | 5 | 5 | 5 | 5 | 5 | 5 | 5 |
| Zigzag filament | 0 | 0 | 0 | 1 | 2 | 2 | 2 | 2 | 2 | 2 | 2 | 2 |
| Straight filament | 5 | 3 | 5 | 4 | 3 | 3 | 3 | 3 | 3 | 3 | 3 | 3 |
| Spiral filament | 0 | 2 | 0 | 0 | 0 | 0 | 0 | 0 | 0 | 0 | 0 | 0 |
| Wave height h (mm) | — | 0.25 | — | 0.25 | 0.4 | 0.25/0.34 | 0.25 | 0.25 | 0.25 | 0.25 | 0.41 | 0.5 |
| Wave pitch Pw (mm) | — | 5 | — | 5 | 5 | 5.00/6.30 | 5 | 5 | 5 | 5 | 8 | 9.6 |
| dXh/Pw | — | 0.019 | — | 0.019 | 0.03 | 0.019/0.019 | 0.019 | 0.019 | 0.019 | 0.019 | 0.02 | 0.02 |
| Lastt twist pitch (mm) | 18 | 18 | 18 | 18 | 18 | 18 | 18 | 18 | 15 | 25 | 18 | 18 |
| Bunch Twist | yes | yes | yes | yes | yes | yes | yes | yes | yes | yes | yes | yes |
| Carbon content (%) | 0.82 | 0.82 | 0.82 | 0.82 | 0.82 | 0.82 | 0.82 | 0.65 | 0.82 | 0.82 | 0.82 | 0.82 |
| Cord characteristics |  |  |  |  |  |  |  |  |  |  |  |  |
| Diameter (mm) | 1.13 | 1.25 | 1.32 | 1.14 | 1.17 | 1.15 | 1.15 | 1.15 | 1.18 | 1.14 | 1.18 | 1.21 |
| Strength (N/sq.mm) | 3015 | 2973 | 2954 | 2984 | 2563 | 2683 | 2946 | 2651 | 2887 | 3004 | 3005 | 2966 |
| Strength reduction (%) | 0 | 1.4 | 2 | 1 | 15 | 11 | 2.3 | 1.8 | 4.2 | 0.4 | 0.3 | 1.6 |
| Elongation @ 50N (%) | 0.065 | 0.132 | 0.283 | 0.073 | 0.123 | 0.091 | 0.094 | 0.095 | 0.101 | 0.09 | 0.121 | 0.131 |
| Bending rigidity (N cm) | 151 | 143 | 137 | 149 | 141 | 143 | 145 | 146 | 142 | 149 | 143 | 142 |
| Tire performance |  |  |  |  |  |  |  |  |  |  |  |  |
| Rubber penetration (%) | 0 | 87 | 94 | 75 | 85 | 98 | 98 | 98 | 99 | 97 | 98 | 98 |
| Rust (index) | 100 | 21 | 13 | 37 | 25 | 6 | 5 | 6 | 2 | 10 | 6 | 6 |
| Reserved strength (%) | 88 | 94 | 96 | 93 | 93 | 97 | 98 | 97 | 99 | 97 | 97 | 97 |

|  | Ex.B7 | Ex.B8 | Ex.B9 | Ref.B7 | Ref.B8 | Ref.B9 | Ref.B10 | Ex.B10 | Ex.B11 | Ref.B11 | Ex.B12 | Ex.B13 | Ref.B12 |
|---|---|---|---|---|---|---|---|---|---|---|---|---|---|
| Filament diameter (mm) | 0.38 | 0.38 | 0.38 | 0.38 | 0.38 | 0.38 | 0.25 | 0.25 | 0.25 | 0.45 | 0.45 | 0.45 | 0.17 |
| Number of filaments | 5 | 5 | 5 | 5 | 5 | 5 | 5 | 5 | 5 | 5 | 5 | 5 | 5 |
| Zigzag filament | 2 | 2 | 2 | 2 | 2 | 2 | 0 | 2 | 2 | 0 | 2 | 2 | 2 |
| Straight filament | 3 | 3 | 3 | 3 | 3 | 3 | 5 | 3 | 3 | 5 | 3 | 3 | 3 |
| Spiral filament | 0 | 0 | 0 | 0 | 0 | 0 | 0 | 0 | 0 | 0 | 0 | 0 | 0 |
| Wave height h (mm) | 0.25 | 0.35 | 0.19 | 0.05 | 1.5 | 0.85 | — | 0.26 | 0.52 | — | 0.24 | 0.57 | 0.39 |
| Wave pitch Pw (mm) | 5 | 5 | 5 | 0.95 | 28 | 16 | — | 3.3 | 6.3 | — | 5 | 12.8 | 3.3 |
| dXh/Pw | 0.02 | 0.027 | 0.014 | 0.02 | 0.02 | 0.02 | — | 0.02 | 0.021 | — | 0.022 | 0.02 | 0.02 |
| Lastt twist pitch (mm) | 18 | 18 | 18 | 18 | 18 | 18 | 18 | 18 | 18 | 25 | 25 | 25 | 18 |
| Bunch Twist | yes | yes | yes | yes | yes | yes | yes | yes | yes | yes | yes | yes | yes |
| Carbon content (%) | 0.88 | 0.82 | 0.82 | 0.82 | 0.82 | 0.82 | 0.82 | 0.82 | 0.82 | 0.82 | 0.82 | 0.82 | 0.82 |
| Cord characteristics |  |  |  |  |  |  |  |  |  |  |  |  |  |
| Diameter (mm) | 1.15 | 1.16 | 1.14 | 1.21 | 1.15 | 1.14 | 0.76 | 0.78 | 0.8 | 1.36 | 1.38 | 1.42 | 0.53 |
| Strength (N/sq.mm) | 3241 | 2849 | 2999 | 2966 | 2983 | 2999 | 3045 | 2899 | 2999 | 2969 | 2903 | 2932 | 2780 |
| Strength reduction (%) | 2.7 | 5.6 | 0.5 | 0.5 | 8.7 | 6.5 | 0 | 4.8 | 1.5 | 0 | 2.2 | 1.2 | 8.7 |
| Elongation @ 50N (%) | 0.094 | 0.103 | 0.087 | 0.131 | 0.094 | 0.087 | 0.113 | 0.128 | 0.136 | 0.059 | 0.071 | 0.089 | 0.132 |
| Bending rigidity (N cm) | 147 | 140 | 148 | 142 | 147 | 148 | 28 | 27 | 25 | 277 | 275 | 272 | 6 |

TABLE 2-continued

Tire_performance

| Rubber penetration (%) | 99 | 94 | 90 | 45 | 56 | 67 | 0 | 93 | 94 | 0 | 99 | 95 | 82 |
|---|---|---|---|---|---|---|---|---|---|---|---|---|---|
| Rust (index) | 2 | 12 | 16 | 43 | 37 | 31 | 100 | 12 | 15 | 100 | 6 | 11 | 25 |
| Reserved strength (%) | 99 | 97 | 94 | 91 | 93 | 96 | 87 | 97 | 96 | 89 | 99 | 97 | 92 |

| | Ref.B13 | Ref.B14 | Ex.B14 | Ex.B15 | Ref.B15 | Ex.B16 | Ref.B16 | Ex.B17 | Ex.B18 | Ex.B19 |
|---|---|---|---|---|---|---|---|---|---|---|
| Filament diameter (mm) | 0.5 | 0.32 | 0.32 | 0.32 | 0.25 | 0.25 | 0.45 | 0.45 | 0.38 | 0.32 |
| Number of filaments | 5 | 6 | 6 | 6 | 6 | 6 | 6 | 6 | 6 | 6 |
| Zigzag filament | 2 | 0 | 2 | 3 | 0 | 2 | 0 | 2 | 2 | 2 |
| Straight filament | 3 | 6 | 4 | 3 | 6 | 4 | 6 | 4 | 4 | 4 |
| Spiral filament | 0 | 0 | 0 | 0 | 0 | 0 | 0 | 0 | 0 | 0 |
| Wave height h (mm) | 0.2 | — | 0.35 | 0.35 | — | 0.32 | — | 0.38 | 0.25 | 0.35 |
| Wave pitch Pw (mm) | 5 | — | 5 | 5 | — | 5 | — | 8 | 5 | 5 |
| dXh/Pw | 0.02 | — | 0.022 | 0.022 | — | 0.021 | — | 0.021 | 0.019 | 0.022 |
| Lastt twist pitch (mm) | 25 | 18 | 18 | 18 | 18 | 18 | 25 | 25 | 18 | 18 |
| Bunch Twist | yes | yes | yes | yes | yes | yes | yes | yes | no | no |
| Carbon content (%) | 0.82 | 0.82 | 0.82 | 0.82 | 0.82 | 0.82 | 0.82 | 0.82 | 0.82 | 0.82 |
| Cord characteristics | | | | | | | | | | |
| Diameter (mm) | 1.51 | 0.97 | 1 | 1.08 | 0.78 | 0.81 | 1.41 | 1.43 | 1.2 | 1.1 |
| Strength (N/sq.mm) | 2630 | 3038 | 2971 | 2942 | 3043 | 2896 | 2972 | 2831 | 2878 | 2913 |
| Strength reduction (%) | 10.2 | 0 | 2.2 | 3.2 | 0 | 4.8 | 0 | 4.7 | 4.5 | 4.1 |
| Elongation @ 50N (%) | 0.065 | 0.075 | 0.098 | 0.119 | 0.107 | 0.125 | 0.056 | 0.072 | 0.125 | 0.137 |
| Bending rigidity (N cm) | 418 | 91 | 89 | 85 | 33 | 31 | 334 | 332 | 141 | 82 |
| Tire_performance | | | | | | | | | | |
| Rubber penetration (%) | 89 | 0 | 99 | 98 | 0 | 98 | 0 | 97 | 93 | 92 |
| Rust (index) | 17 | 100 | 3 | 6 | 100 | 7 | 100 | 12 | 14 | 15 |
| Reserved strength (%) | 91 | 88 | 98 | 98 | 87 | 98 | 89 | 96 | 95 | 94 |

Ex.B1 to Ex.B9 had a cord structure shown in FIG. 9(A). Ex.B14 to 17 had a cord construction shown in FIG. 10(B).

The direction of twisting filaments into a bunch was the same as the last twist. (S direction) The twist pitch Pf was 10 times the last twist pitch Pc.

Ref.B1, B10, B11, B14, B15 and B16 were conventional compact cords composed of straight filaments. Ref.B3 was an open cord composed of loosely twisted nonzigzag filaments. Ref.B6 had two kinds of zigzag filaments.

* Cord Embodiment 3

This embodiment is designed as a carcass cord for reinforcing a carcass of a pneumatic radial tire, which can be suitably used as a substitute for a conventional steel cord of a 3+9 or 3+9+15 construction widely used in heavy duty radial tires for trucks, buses and the like.

The cord 1 in this embodiment is composed of 8 to 12 zigzag filaments 2A. All the filaments are the same diameter d of 0.15 to 0.30 mm.

The zigzag filaments 2A include at least two kinds of zigzag filaments 2A1–2An having different zigzag pitch lengths Pw1–Pwn. The number (n) of the kinds is preferably two. The number of zigzag filaments in each kind is at least two, preferably at least three.

The cord 1 is formed by twisting all the zigzag filaments 2A together at a twist pitch of 10 to 25 mm (last twist). During twisting the zigzag filaments 2 A, the relative positions thereof are changed repeatedly along the length so that a central filament (core filament) is not formed by a specific filament, and all the zigzag filaments 2A are the substantially same length when measured along the zigzag of each filament. More specifically, the "changing of the relative positions" means that any one of the filaments may be positioned in the center of the cord in a place but in another place positioned on the outside. For example, two of the filaments are interlaced at predetermined intervals along the cord length, wherein the two interlaced filaments are changed or replaced in a predetermined regular or irregular order. As the zigzag filaments 2A are interlaced, a problem of loosening of the filaments can be solved.

If there is a large difference in the filament lengths, some filaments tends to break out during rubberizing the cords.

In each zigzag filament 2A, the filament diameter d, zigzag pitch lengths Pw and zigzag wave height h are set to satisfy the following conditions: Pw is 10.0 to 35.0 times, preferably 15.0 to 30.0 times d; and h is 0.5 to 4.0 times, preferably 1.0 to 3.0 times d.

Further, a zigzag filament 2A1 having a minimum zigzag pitch Pw1 and the remaining zigzag filament 2An having a larger zigzag pitch Pun satisfy the following condition: hn/Pwn is 0.75 to 1.25 times h1/Pw1, wherein: h1 is the zigzag wave height of the zigzag filament 2A1; and hn is the zigzag wave height of the zigzag filament 2An. However, if there are plural zigzag filaments having the same minimum zigzag pitch lengths Pw1 but different heights, the minimum height is used as h1.

FIG. 11(A) shows a cord composed of six zigzag filaments 2A1 having a small zigzag pitch Pw1 and three zigzag filaments 2An having a larger zigzag pitch Pwn, which are twisted together by changing the relative positions.

FIG. 11(B) shows a cord composed of five zigzag filaments 2A1 having a small zigzag pitch Pw1 and three zigzag filaments 2An having a larger zigzag pitch Pwn, which are twisted together by changing the relative positions.

If the diameter d is less than 0.15 mm, the zigzag shape is apt to return to a straight shape during twisting, and the rubber penetration decreases. If the diameter d is more than 0.30 mm, it is difficult to provide a suppleness required in a tire carcass, and the fatigue resistance of the cord is lowered.

If the twist pitch is less than 10 mm, the initial elongation of the cord is too large for the carcass of a pneumatic tire, and thus it becomes difficult to keep a stable tire shape. If the twist pitch is more than 25 mm, the filaments are liable to loosen at cut ends, and thus tire durability is liable to decrease.

If the zigzag pitch length Pw is less than 10.0 times the diameter d, the strength of the filament tends to decrease when shaped into a zigzag. If more than 35.0 times, the rubber penetration decreases.

If the zigzag wave height h is less than 0.5 times the diameter d, it becomes difficult to increase the rubber penetration. If more than 4.0 times, the strength of the filament tends to decrease when shaped into a zigzag.

If hn/Pwn is less than 0.75 times h1/Pw1 or more than 1.25 times h1/Pw1, it becomes difficult to equalize the filament lengths, and thus the cord load is liable to concentrate on a particular filament, and as a result the cord strength is liable to decrease.

* Comparison tests

Various experimental steel cords were made, and test tires having a carcass made of the experimental cords were also made, and the following comparison tests were conducted. The results of the tests are shown in Table 3.

* Cord Strength Reduction Test
  Same as above.
* Bending Rigidity Test
  Same as above.
* Rubber Penetration Test
  Same as above.
* Rust and Reserved Strength Test
  Same as above.
* Filament Breaking-out
  During rubberizing a carcass ply for a heavy duty tire, the cords were investigated if the filaments broke out from the cord.

Cord-cut-end Looseness

In this test, the degree of looseness at cut ends of the cord was evaluated.

TABLE 3

|  | Ref.C1 | Ref.C2 | Ref.C3 | Ref.C4 | Ref.C5 | Ref.C6 | Ref.C7 | Ref.C8 | Ref.C9 |
|---|---|---|---|---|---|---|---|---|---|
| Filament diameter (mm) | 0.20 | 0.20 | 0.20 | 0.20 | 0.20 | 0.20 | 0.20 | 0.20 | 0.20 |
| Number of filaments | 9 | 9 | 9 | 9 | 9 | 9 | 9 | 9 | 9 |
| Zigzag filament | 0 | 5 | 0 | 9 | 9 | 9 | 9 | 9 | 9 |
| Straight filament | 9 | 4 | 0 | 0 | 0 | 0 | 0 | 0 | 0 |
| Spiral filament | 0 | 0 | 9 | 0 | 0 | 0 | 0 | 0 | 0 |
| Wave height h (mm) | — | 0.45 | 0.65 | 0.45 | 0.45/0.45 | 0.45/0.30 | 0.45/0.30 | 0.08/0.05 | 1.40/1.00 |
| Wave pitch Pw (mm) | — | 5.00 | 5.00 | 5.00 | 5.00/3.00 | 1.80/1.20 | 12.0/8.0 | 5.00/3.30 | 5.00/3.30 |
| h/Pw×100 | — | 9.0 | 13.0 | 9.0 | 9.0/15.0 | 25.0/25.0 | 3.8/3.8 | 1.6/1.5 | 28.0/30.3 |
| Number of respective filaments | — | 5 | 9 | 9 | 3/6 | 3/6 | 3/6 | 3/6 | 3/6 |
| filament length (cm/100 cm cord) | 105.0 | 106.7 | 109.3 | 106.7 | 106.7/109.7 | 117.4/117.4 | 105.3/105.3 | 105.1/105.0 | 120.3/122.8 |
| Last twist pitch (mm) | 17.0 | 17.0 | 17.0 | 17.0 | 17.0 | 17.0 | 17.0 | 17.0 | 17.0 |
| Filament twist | yes | yes | yes | yes | yes | yes | yes | yes | yes |
| Carbon content (%) | 0.82 | 0.82 | 0.82 | 0.82 | 0.82 | 0.82 | 0.82 | 0.82 | 0.82 |
| Cord characteristics |  |  |  |  |  |  |  |  |  |
| Diameter (mm) | 0.71 | 0.73 | 0.85 | 0.78 | 0.77 | 0.75 | 0.75 | 0.75 | 0.75 |
| Strength (N/sq.mm) | 3052 | 2750 | 2785 | 3015 | 2880 | 2723 | 3018 | 3027 | 2675 |
| Strength reduction (%) | 0.0 | 9.9 | 8.7 | 1.2 | 5.6 | 10.8 | 1.1 | 0.8 | 12.3 |
| Elongation @ 50N (%) | 0.107 | 0.112 | 0.265 | 0.118 | 0.125 | 0.153 | 0.127 | 0.118 | 0.232 |
| Bending rigidity (N·cm) | 22 | 22 | 20 | 21 | 22 | 22 | 22 | 22 | 22 |
| Tire performance |  |  |  |  |  |  |  |  |  |
| Rubber penetration (%) | 0 | 76 | 73 | 75 | 95 | 91 | 64 | 53 | 90 |
| Rust (index) | 100 | 45 | 47 | 46 | 10 | 20 | 57 | 68 | 23 |
| Reserved strength (%) | 88 | 94 | 92 | 96 | 99 | 97 | 91 | 90 | 97 |
| Breaking out | none | some | none | none | few | none | none | none | none |
| Cut-end loose | none | none | none | none | none | none | none | none | none |

|  | Ex.C1 | Ref.C10 | Ref.C11 | Ex.C2 | Ex.C3 | Ex.C4 | Ex.C5 | Ex.C6 |
|---|---|---|---|---|---|---|---|---|
| Filament diameter (mm) | 0.20 | 0.20 | 0.20 | 0.20 | 0.20 | 0.20 | 0.20 | 0.20 |
| Number of filaments | 9 | 9 | 9 | 9 | 9 | 9 | 9 | 9 |
| Zigzag filament | 9 | 9 | 9 | 9 | 9 | 9 | 9 | 9 |
| Straight filament | 0 | 0 | 0 | 0 | 0 | 0 | 0 | 0 |
| Spiral filament | 0 | 0 | 0 | 0 | 0 | 0 | 0 | 0 |
| Wave height h (mm) | 0.45/0.30 | 0.45/0.30 | 0.45/0.30 | 0.45/0.30 | 0.45/0.30 | 0.45/0.30 | 0.45/0.30 | 0.60/0.48 |
| Wave pitch Pw (mm) | 5.00/3.30 | 5.00/3.30 | 5.00/3.30 | 5.00/3.30 | 5.00/3.30 | 5.00/3.30 | 5.00/3.30 | 6.30/5.00 |
| h/Pw×100 | 9.0/9.1 | 9.0/9.1 | 9.0/9.1 | 9.0/9.1 | 9.0/9.1 | 9.0/9.1 | 9.0/9.1 | 9.5/9.6 |
| Number of respective filaments | 3/6 | 3/6 | 3/6 | 3/6 | 3/6 | 3/6 | 3/6 | 3/6 |
| filament length (cm/100 cm cord) | 106.7/106.7 | 105.6/105.6 | 107.8/107.8 | 106.7/106.7 | 107.2/107.2 | 105.6/105.6 | 106.7/106.7 | 106.7/106.9 |
| Last twist pitch (mm) | 17.0 | 28.0 | 8.0 | 23.0 | 10.0 | 17.0 | 17.0 | 17.0 |
| Filament twist | yes | yes | yes | yes | yes | yes | yes | yes |
| Carbon content (%) | 0.82 | 0.82 | 0.82 | 0.82 | 0.82 | 0.65 | 0.88 | 0.82 |
| Cord characteristics |  |  |  |  |  |  |  |  |
| Diameter (mm) | 0.75 | 0.75 | 0.77 | 0.75 | 0.77 | 0.75 | 0.76 | 0.80 |
| Strength (N/sq.mm) | 3010 | 3026 | 2890 | 3020 | 2975 | 2900 | 3250 | 2985 |
| Strength reduction (%) | 1.4 | 0.9 | 5.3 | 1.0 | 2.5 | 1.2 | 1.7 | 2.2 |
| Elongation @ 50N (%) | 0.122 | 0.118 | 0.215 | 0.121 | 0.157 | 0.132 | 0.137 | 0.183 |
| Bending rigidity (N·cm) | 22 | 23 | 20 | 23 | 20 | 22 | 22 | 19 |
| Tire performance |  |  |  |  |  |  |  |  |
| Rubber penetration (%) | 95 | 92 | 96 | 92 | 96 | 95 | 95 | 96 |
| Rust (index) | 11 | 14 | 8 | 14 | 8 | 10 | 10 | 9 |
| Reserved strength (%) | 98 | 98 | 99 | 98 | 99 | 98 | 99 | 95 |
| Breaking out | none | none | none | none | none | none | none | none |

TABLE 3-continued

| Cut-end loose | none | some | none | few | none | none | none | none |
|---|---|---|---|---|---|---|---|---|

| | Ex.C7 | Ex.C8 | Ref.C12 | Ref.C13 | Ref.C14 | Ex.C9 | Ref.C15 | Ex.C10 | Ref.C16 | Ex.C11 |
|---|---|---|---|---|---|---|---|---|---|---|
| Filament diameter (mm) | 0.20 | 0.20 | 0.125 | 0.35 | 0.15 | 0.15 | 0.30 | 0.30 | 0.20 | 0.20 |
| Number of filaments | 9 | 9 | 9 | 9 | 9 | 9 | 9 | 9 | 8 | 8 |
| Zigzag filament | 9 | 9 | 9 | 9 | 0 | 9 | 0 | 9 | 0 | 8 |
| Straight filament | 0 | 0 | 0 | 0 | 9 | 0 | 9 | 0 | 8 | 0 |
| Spiral filament | 0 | 0 | 0 | 0 | 0 | 0 | 0 | 0 | 0 | 0 |
| Wave height h (mm) | 0.45/0.30 | 0.55/0.41/0.29 | 0.55/0.37 | 0.41/0.29 | — | 0.45/0.32 | — | 0.64/0.51 | — | 0.45/0.30 |
| Wave pitch Pw (mm) | 5.00/3.30 | 6.30/4.70/3.30 | 4.70/3.30 | 4.70/3.30 | — | 4.70/3.30 | — | 8.00/6.30 | — | 5.00/3.30 |
| h/PwX100 | 9.0/9.1 | 8.7/8.7/8.8 | 11.7/11.2 | 8.7/8.8 | — | 96/9.7 | — | 8.0/8.1 | — | 9.0/9.1 |
| Number of respective filaments | 6/3 | 3/3/3 | 3/6 | 3/6 | — | 3/6 | — | 3/6 | — | 315 |
| filament length (cm/100 cm cord) | 106.7/106.7 | 106.4/106.7/106.6 | 108.0/107.6 | 106.7/106.6 | 104.7 | 107.0/106.9 | 105.4 | 106.3/106.2 | 104.9 | 106.7/106.7 |
| Last twist pitch (mm) | 17.0 | 17.0 | 17.0 | 17.0 | 17.0 | 17.0 | 17.0 | 17.0 | 17.0 | 17.0 |
| Filament twist | yes | yes | yes | yes | yes | yes | yes | yes | yes | yes |
| Carbon content (%) | 0.82 | 0.82 | 0.82 | 0.82 | 0.82 | 0.82 | 0.82 | 0.82 | 0.82 | 0.82 |
| Cord characteristics | | | | | | | | | | |
| Diameter (mm) | 0.78 | 0.77 | 0.44 | 1.24 | 0.71 | 0.55 | 1.09 | 1.15 | 0.69 | 0.74 |
| Strength (N/sq.mm) | 3015 | 3009 | 3014 | 2735 | 3108 | 3092 | 3035 | 2892 | 3052 | 3013 |
| Strength reduction (%) | 1.2 | 1.4 | 1.0 | 8.5 | 0.0 | 0.5 | 0.0 | 5.2 | 0.0 | 1.3 |
| Elongation @ 50N (%) | 0.120 | 0.123 | 0.182 | 0.098 | 0.115 | 0.153 | 0.089 | 0.099 | 0.110 | 0.145 |
| Bending rigidity (N · cm) | 22 | 21 | 3 | 185 | 7 | 6 | 101 | 97 | 18 | 19 |
| Tire performance | | | | | | | | | | |
| Rubber penetration (%) | 94 | 97 | 77 | 89 | 0 | 93 | 0 | 96 | 0 | 95 |
| Rust (index) | 13 | 9 | 42 | 17 | 100 | 12 | 100 | 7 | 100 | 10 |
| Reserved strength (%) | 97 | 98 | 91 | 84 | 82 | 97 | 87 | 97 | 86 | 98 |
| Breaking out | none | none | none | none | none | none | none | none | none | none |
| Cut-end loose | none | none | none | none | none | none | none | none | none | none |

| | Ref.C17 | Ex.C12 | Ref.C18 | Ex.C13 | Ex.C14 |
|---|---|---|---|---|---|
| Filament diameter (mm) | 0.23 | 0.23 | 0.20 | 0.20 | 0.23 |
| Number of filaments | 12 | 12 | 9 | 9 | 12 |
| Zigzag filament | 0 | 12 | 9 | 9 | 12 |
| Straight filament | 12 | 0 | 0 | 0 | 0 |
| Spiral filament | 0 | 0 | 0 | 0 | 0 |
| Wave height h (mm) | — | 0.45/0.30 | 0.45/0.45 | 0.45/0.30 | 0.45/0.30 |
| Wave pitch Pw (mm) | — | 5.00/3.30 | 5.00/3.00 | 5.00/3.30 | 5.00/3.30 |
| h/PwX100 | — | 9.0/9.1 | 9.0/15.0 | 9.0/9.1 | 9.0/9.1 |
| Number of respective filaments | — | 4/8 | 3/6 | 3/6 | 4/8 |
| filament length (cm/100 cm cord) | 105.2 | 106.7/106.7 | 106.7/109.7 | 106.7/106.7 | 106.7/106.7 |
| Last twist pitch (mm) | 17.0 | 17.0 | 17.0 | 17.0 | 17.0 |
| Filament twist | yes | yes | yes | no | no |
| Carbon content (%) | 0.82 | 0.82 | 0.82 | 0.82 | 0.82 |
| Cord characteristics | | | | | |
| Diameter (mm) | 1.02 | 1.06 | 0.77 | 0.80 | 1.10 |
| Strength (N/sq.mm) | 3048 | 3006 | 2880 | 2976 | 2960 |
| Strength reduction (%) | 0.0 | 1.4 | 5.6 | 2.5 | 2.9 |
| Elongation @ 50N (%) | 0.097 | 0.148 | 0.183 | 0.147 | 0.198 |
| Bending rigidity (N · cm) | 48 | 47 | 22 | 19 | 45 |
| Tire performance | | | | | |
| Rubber penetration (%) | 0 | 90 | 95 | 90 | 91 |
| Rust (index) | 100 | 15 | 10 | 15 | 14 |
| Reserved strength (%) | 90 | 98 | 99 | 95 | 98 |
| Breaking out | none | none | some | none | none |
| Cut-end loose | none | none | none | few | few |

Ref.C1, C14, C15, C16 and C17 were conventional compact cords composed of straight filaments twisted together without changing the relative positions. Ref.C2 and C4 were composed of one kind of zigzag filaments.

* Cord Embodiment 4

This embodiment is designed as a cord of a bead reinforcing layer for reinforcing bead portions of a pneumatic radial tire, which can be suitably used as a substitute for a conventional steel cord of a 3+9 or 3+9+15 construction widely used in heavy duty radial tires for trucks, buses and the like.

The cord in this embodiment is composed of nine zigzag filaments 2A having the same diameter d of 0.17 to 0.25 mm.

The zigzag filaments 2A include at least two kinds of zigzag filaments 2A1–2An having different zigzag pitch lengths Pw1–Pwn. The number (n) of the kinds is preferably two. The number of zigzag filaments in each kind is at least two, preferably at least three.

In each zigzag filament 2A, the filament diameter d, zigzag pitch lengths Pw and zigzag wave height h are set to satisfy the following conditions: Pw is 10.0 to 35.0 times d; and h is 0.5 to 4.0 times d.

Further, a zigzag filament 2A1 having a minimum zigzag pitch Pw1 and the remaining zigzag filament 2An having a larger zigzag pitch Pwn satisfy the following condition: hn/Pwn is 0.75 to 1.25 times h1/Pw1, wherein h1 is the zigzag wave height of the zigzag filament 2A1, and hn is the zigzag wave height of the zigzag filament 2An. However, if there are zigzag filaments having the same minimum zigzag pitch lengths Pw1 but different heights, the minimum height is used as h1.

The cord is formed by twisting all the zigzag filaments 2A together at a twist pitch of 10 to 20 mm (last twist). As explained in the formed Embodiment 3, during twisting the zigzag filaments 2A, the relative positions thereof are changed so that a central filament or core is not formed by a specific filament, and all the zigzag filaments 2A are the substantially same length when measured along the zigzag of each filament.

In this embodiment, further, a wrapping wire is wound around the resultant bunch 4 of the twisted filaments 2A. Preferably, the wrapping wire 5 is a single filament made of a high carbon steel including 0.65 to 0.88 wt % of carbon. The diameter of the wrapping wire is 0.13 to 0.17 mm. The winding direction is reverse to the twisting direction, and the winding pitch is 3.0 to 7.0 mm.

If the winding pitch is less than 3.0 mm, the production efficiency is greatly decreased. If the winding pitch is more than 7 mm and/or the diameter of the wrapping wire is less than 0.13 mm, the cord-shape-retaining function decreases to decrease the dimensional accuracy of a rubber reinforcing layer. If the diameter of the wrapping wire is more than 0.17 mm, as the cord diameter and weight increase, it is not preferable. If the carbon content of the steel wire 5 is lower than 0.65 wt %, the strength tends to decrease. If the carbon content is higher than 0.88 wt %, the wire becomes too hard and the bending strength decreases.

FIG. 12 shows a cord composed of six zigzag filaments 2A1 having a small zigzag pitch Pw1 and three zigzag filaments 2An having a larger zigzag pitch Pwn.

If the filament diameter d is less than 0.17 mm, it becomes difficult to obtain a rigidity required for a bead reinforcing layer of the heavy duty tires, and as a result, tire durability decreases. Further, the zigzag shape is apt to return to a straight shape during twisting, and the rubber penetration decreases. If the diameter d is more than 0.25 mm, it is difficult to provide a bead reinforcing layer with a suppleness required during applying to the bead portion.

If the twist pitch is less than 10 mm, the initial elongation of the cord is too large for the bead reinforcing layer of a pneumatic tire, and thus the reinforcing effect becomes insufficient. If the twist pitch is more than 20 mm, the filaments are liable to loosen at cut ends, and thus tire durability is liable to decrease.

If the zigzag wave height h is less than 0.5 times the diameter d, it becomes difficult to increase the rubber penetration. If more than 4.0 times, the strength of the filament tends to decrease when shaped into a zigzag.

If the zigzag pitch length Pw is less than 10.0 times the diameter d, the strength of the filament tends to decrease when shaped into a zigzag. If more than 35.0 times, the rubber penetration decreases.

If hn/Pwn is less than 0.75 times h1/Pw1 or more than 1.25 times h1/Pw1, it becomes difficult to equalize the filament lengths, and thus the cord load is liable to concentrate on a particular filament, and as a result the cord strength is liable to decrease.

* Comparison Tests

Various experimental steel cords were made, and test tires having a bead reinforcing layer of the experimental cords were also made, and the following comparison tests were conducted. The results of the tests are shown in Table 4.

* Cord Strength Reduction Test

Same as above.

* Bending Rigidity Test

Same as above.

* Rubber Penetration Test

Same as above.

* Rust and Reserved Strength Test

Same as above.

* Filament Breaking-out

Same as above.

* Cord-cut-end Looseness

Same as above.

* Shape Retention Test

The cord of 1,000 mm long was coiled into a loop of 200 mm diameter. The loop was collapsed gradually in fifteen seconds as follows: the loop was put on a horizontal plane; and one of two oppositely opposed points was fixed, and the other is pressed towards the fixed point so that the two points contact each other. The collapsed state was maintained for ten seconds. Then, the pressing force was decreased gradually in fifteen seconds to allow the loop to return to its original shape. And the distance L between the two points was measured to obtain the shape retention rate E=(L/200) X100. The shape retention rate E of each cord was divided by that of Ex.D1 and converted into the reciprocal number and further multiplied by 100. The larger the value, the better the shape retention.

* Cord Pull-out Resistance Test

From the tire, a specimen of the bead cord reinforcing layer was cut out, and a force require to pull a cord 15 mm out of the specimen was measured.

TABLE 4

|  | Ref.D1 | Ref.D2 | Ref.D3 | Ref.D4 | Ref.D5 | Ref.D6 | Ref.D7 | Ref.D8 |
|---|---|---|---|---|---|---|---|---|
| Cord structure (Ref.) or Filament diameter (Ex.) | 1X12X.22 | 3X.22 + 9X.20 + 1X.15 | 1X9X.20 + 1X.15 | 1X9X.20 + 1X.15 | 1X9X.20 + 1X.15 | 1X9X.20 + 1X.15 | 1X9X.20 + 1X.15 | 1X9X.15 + 1X.15 |
| Number of zigzag filaments | 0 | 0 | 0 | 5 | 9 | 9 | 9 | 9 |
| Wave height h (mm) | — | — | — | 0.45 | 0.45 | 0.45/0.45 | 0.45/0.30 | 0.45/0.30 |
| Wave pitch PW (mm) | — | — | — | 5.00 | 5.00 | 5.00/3.00 | 5.00/3.30 | 5.00/3.30 |
| h/PwX100 | — | — | — | 9.0 | 9.0 | 9.0/15.0 | 9.0/9.1 | 9.0/9.1 |
| number of respective filaments | — | — | — | 9 | 9 | 3/6 | 3/6 | 3/6 |
| Filament length (cm) per 100 cm long cord | 105.5 | 105.3 | 105.0 | zigzag 106.7 straight 105.0 | 106.7 | 106.7/109.7 | 106.7/106.7 | 106.7/106.7 |
| Carbon content (%) | 0.82 | 0.82 | 0.82 | 0.82 | 0.82 | 0.82 | 0.82 | 0.82 |
| Last twist pitch (mm) | 15.0 | 15.0 | 17.0 | 17.0 | 17.0 | 17.0 | 17.0 | 17.0 |
| Filament Twist | yes | yes | yes | yes | yes | yes | yes | yes |
| Wrapping wire dia. (mm) | 0.15 | 0.15 | 0.15 | 0.15 | 0.15 | 0.15 | 0.15 | 0.15 |
| Wrapping wire winding pitch (mm) | 3.5 | 3.5 | 5.0 | 5.0 | 5.0 | 5.0 | 9.0 | 5.0 |
| Cord characteristic | | | | | | | | |
| Diameter (mm) | 1.18 | 1.09 | 1.10 | 1.12 | 1.12 | 1.17 | 1.13 | 0.85 |
| Strength (N/sq.mm) | 2916 | 2935 | 3035 | 2635 | 2927 | 2735 | 2925 | 2955 |
| Strength reduction (%) | — | — | 0.0 | 13.2 | 3.6 | 9.9 | 3.6 | 2.3 |
| Elongation @ 50N (%) | 0.089 | 0.090 | 0.119 | 0.120 | 0.148 | 0.137 | 0.123 | 0.143 |
| Bending rigidity (N cm) | 51 | 41 | 33 | 32 | 30 | 31 | 32 | 9 |
| Shape retention (index) | 98 | 99 | 98 | 96 | 99 | 95 | 85 | 102 |
| Tire performance | | | | | | | | |
| Rubber penetration (%) | 0 | 6 | 0 | 68 | 78 | 91 | 91 | 85 |
| Pullin-out force (N/15 mm) | 5 | 78 | 128 | 136 | 152 | 173:cord cut | 178:cord cut | 143 |
| Rust (index) | 100 | 87 | 95 | 50 | 42 | 21 | 20 | 28 |
| Reserved strength (%) | 89 | 92 | 90 | 92 | 93 | 96 | 97 | 92 |
| Filament break-out | none | none | none | some | none | some | none | none |
| Cut-end loose | none | none | none | none | none | none | none | none |

|  | Ref.D9 | Ref.D10 | Ref.D11 | Ref.D12 | Ref.D13 | Ref.D14 | Ref.D15 | Ref.D16 |
|---|---|---|---|---|---|---|---|---|
| Cord structure (Ref.) or Filament diameter (Ex.) | 1X9X.30 + 1X.15 | 1X9X.20 + 1X.15 | 1X9X.20 + 1X.15 | 1X9X.20 + 1X.15 | 1X9X.20 + 1X.15 | 1X9X.20 + 1X.10 | 1X9X.20 + 1X.22 | 1X9X.20 + 1X.15 |
| Number of zigzag filaments | 9 | 9 | 9 | 9 | 9 | 9 | 9 | 9 |
| Wave height h (mm) | 0.45/0.30 | 0.45/0.30 | 0.45/0.30 | 0.08/0.05 | 1.40/1.00 | 0.45/0.30 | 0.45/0.30 | 0.45/0.30 |
| Wave pitch PW (mm) | 5.00/3.30 | 1.80/1.20 | 12.0/8.0 | 5.00/3.30 | 5.0/3.30 | 5.00/3.30 | 5.00/3.30 | 5.00/3.30 |
| h/PwX100 | 9.0/9.1 | 25.0/25.0 | 3.8/3.8 | 1.6/1.5 | 28.0/30.3 | 9.0/9.1 | 9.0/9.1 | 9.0/9.1 |
| number of respective filaments | 3/6 | 3/6 | 3/6 | 3/6 | 3/6 | 3/6 | 3/6 | 3/6 |
| Filament length (cm) per 100 cm long cord | 106.7/106.7 | 117.4/117.4 | 105.3/105.3 | 105.1/105.0 | 120.3/122.8 | 106.7/106.7 | 106.7/106.7 | 105.6/105.6 |
| Carbon content (%) | 0.82 | 0.82 | 0.82 | 0.82 | 0.82 | 0.82 | 0.82 | 0.82 |
| Last twist pitch (mm) | 17.0 | 17.0 | 17.0 | 17.0 | 17.0 | 17.0 | 17.0 | 28.0 |
| Filament Twist | yes | yes | yes | yes | yes | yes | yes | yes |
| Wrapping wire dia. (mm) | 0.15 | 0.15 | 0.15 | 0.15 | 0.15 | 0.15 | 0.15 | 0.15 |
| Wrapping wire winding pitch (mm) | 5.0 | 5.0 | 9.0 | 5.0 | 5.0 | 5.0 | 5.0 | 5.0 |
| Cord characteristic | | | | | | | | |
| Diameter (mm) | 1.75 | 1.17 | 1.13 | 1.13 | 1.17 | 1.13 | 1.28 | 1.13 |
| Strength (N/sq.mm) | 2873 | 2732 | 2925 | 2945 | 2673 | 2925 | 2931 | 3007 |
| Strength reduction (%) | 5.3 | 10.0 | 3.6 | 3.0 | 11.9 | 3.6 | 3.4 | 1.2 |
| Elongation @ 50N (%) | 0.104 | 0.217 | 0.115 | 0.117 | 0.247 | 0.129 | 0.121 | 0.117 |
| Bending rigidity (N cm) | 32 | 31 | 32 | 31 | 32 | 30 | 35 | 33 |
| Shape retention (index) | 94 | 96 | 98 | 99 | 94 | 82 | 102 | 92 |
| Tire performance | | | | | | | | |
| Rubber penetration (%) | 91 | 92 | 63 | 58 | 90 | 92 | 91 | 88 |
| Pullin-out force (N/15 mm) | 172:cord cut | 135 | 170:cord cut | 132 | 171:cord cut | 155:cord cut | 165:cord cut | 163:cord cut |
| Rust (index) | 20 | 17 | 54 | 64 | 12 | 23 | 20 | 28 |
| Reserved strength (%) | 97 | 92 | 91 | 90 | 97 | 93 | 89 | 95 |
| Filament break-out | none | none | none | none | none | none | none | none |
| Cut-end loose | none | none | none | none | none | none | none | occurred |

|  | Ref.D17 | Ex.D1 | Ex.D2 | Ex.D3 | Ex.D4 | Ex.D5 | Ex.D6 | Ex.D7 |
|---|---|---|---|---|---|---|---|---|
| Cord structure (Ref.) or Filament diameter (Ex.) | 1X9X.20 + 1X.15 | 0.20 | 0.20 | 0.20 | 0.20 | 0.20 | 0.18 | 0.25 |
| Number of zigzag filaments | 9 | 9 | 9 | 9 | 9 | 9 | 9 | 9 |
| Wave height h (mm) | 0.45/0.30 | 0.45/0.30 | 0.45/0.30 | 0.45/0.30 | 0.45/0.30 | 0.45/0.30 | 0.45/0.30 | 0.45/0.30 |
| Wave pitch PW (mm) | 5.00/3.30 | 5.00/3.30 | 5.00/3.30 | 5.00/3.30 | 5.00/3.30 | 5.00/3.30 | 5.00/3.30 | 5.00/3.30 |
| h/PwX100 | 9.0/9.1 | 9.0/9.1 | 9.0/9.1 | 9.0/9.1 | 9.0/9.1 | 9.0/9.1 | 9.0/9.1 | 9.0/9.1 |
| number of respective filaments | 3/6 | 106.7/106.7 | 106.71/06.7 | 106.7/106.7 | 106.7/106.7 | 106.7/106.7 | 106.5/106.5 | 107.0/106.9 |
| Filament length (cm) per 100 cm long cord | 107.8/107.8 | 3/6 | 3/6 | 3/6 | 3/6 | 3/6 | 3/6 | 3/6 |

TABLE 4-continued

| | | | | | | | | |
|---|---|---|---|---|---|---|---|---|
| Carbon content (%) | 0.82 | 0.82 | 0.65 | 0.88 | 0.82 | 0.82 | 0.82 | 0.82 |
| Last twist pitch (mm) | 8.0 | 17.0 | 17.0 | 17.0 | 10.0 | 20.0 | 15.0 | 17.0 |
| Filament Twist | yes | yes | yes | yes | yes | yes | yes | yes |
| Wrapping wire dia. (mm) | 0.15 | 0.15 | 0.15 | 0.15 | 0.15 | 0.15 | 0.13 | 0.17 |
| Wrapping wire winding pitch (mm) | 5.0 | 5.0 | 5.0 | 5.0 | 5.0 | 5.0 | 3.0 | 7.0 |
| Cord characteristic | | | | | | | | |
| Diameter (mm) | 1.15 | 1.13 | 1.13 | 1.14 | 1.17 | 1.11 | 1.01 | 1.41 |
| Strength (N/sq.mm) | 2873 | 2970 | 2840 | 3012 | 2963 | 3003 | 3009 | 2967 |
| Strength reduction (%) | 5.3 | 2.1 | 1.3 | 2.8 | 2.4 | 1.1 | 0.9 | 2.2 |
| Elongation @ 50N (%) | 0.208 | 0.123 | 0.132 | 0.130 | 0.142 | 0.128 | 0.152 | 0.115 |
| Bending rigidity (N cm) | 30 | 32 | 32 | 33 | 30 | 34 | 24 | 59 |
| Shape retention (index) | 98 | 100 | 100 | 100 | 101 | 97 | 101 | 98 |
| Tire_performance | | | | | | | | |
| Rubber penetration (%) | 96 | 91 | 95 | 95 | 97 | 91 | 95 | 95 |
| Pullin-out force (N/15 mm) | 178:cord cut | 178:cord cut | 170:cord cut | 182:cord cut | 178:cord cut | 180:cord cut | 143:cord cut | 280:cord cut |
| Rust (index) | 8 | 12 | 9 | 9 | 7 | 13 | 6 | 6 |
| Reserved strength (%) | 96 | 97 | 98 | 99 | 98 | 97 | 95 | 98 |
| Filament break-out | none | none | none | none | none | none | none | none |
| Cut-end loose | none | none | none | none | none | slight | none | none |

| | Ex.D8 | Ex.D9 |
|---|---|---|
| Cord structure (Ref.) or Filament diameter (Ex.) | 0.25 | 0.20 |
| Number of zigzag filaments | 9 | 9 |
| Wave height h (mm) | 0.69/0.55 | 0.45/0.30 |
| Wave pitch PW (mm) | 8.00/6.30 | 5.00/3.30 |
| h/PwX100 | 8.6/8.7 | 9.0/9.1 |
| number of respective filaments | 106.6/106.4 | 106.7/106.7 |
| Filament length (cm) per 100 cm long cord | 3/6 | 3/6 |
| Carbon content (%) | 0.82 | 0.82 |
| Last twist pitch (mm) | 17.0 | 17.0 |
| Filament Twist | yes | no |
| Wrapping wire dia. (mm) | 0.17 | 0.15 |
| Wrapping wire winding pitch (mm) | 7.0 | 5.0 |
| Cord characteristic | | |
| Diameter (mm) | 1.45 | 1.19 |
| Strength (N/sq.mm) | 2931 | 2928 |
| Strength reduction (%) | 3.4 | 3.5 |
| Elongation @ 50N (%) | 0.123 | 0.152 |
| Bending rigidity (N cm) | 57 | 29 |
| Shape retention (index) | 97 | 93 |
| Tire_performance | | |
| Rubber penetration (%) | 91 | 91 |
| Pullin-out force (N/15 mm) | 270:cord cut | 172:cord cut |
| Rust (index) | 13 | 15 |
| Reserved strength (%) | 97 | 96 |
| Filament break-out | none | none |
| Cut-end loose | none | slight |

Ref.D1 and D3 were conventional compact cords composed of nonzigzag filaments. Ref.D2 had a layered structure having a specific core filament. Ref.D4 was formed by twisting one kind of zigzag filaments and nonzigzag filaments together. Ref.D5 was formed by twisting one kind of zigzag filaments together.

In the cord pull-out resistance test, the filaments of every Example cord were broken without some of them coming out, which shows that the adhesion to the rubber was excellent.

In the cord-cut-end looseness test, Ex.D5 and D9 caused slight looseness by which no problem would be causes with tire making processes.

* Tire Embodiment

Next, a pneumatic tire according to the present invention is described according to FIG. 13.

In FIG. 13, a pneumatic tire T is a radial tire for heavy duty vehicles such as trucks, buses and the like.

The tire T comprises a tread portion 12, a pair of axially spaced bead portions 13 with a bead core 15 therein, a pair of sidewall portions 13 extending between the tread edges and the bead portions 14, a carcass C extending between the bead portions 14, and a belt 17 disposed radially outside the carcass C in the tread portion 12.

The carcass C comprises at least one ply of radially arranged cords extending between the bead portions through the tread portion and the sidewall portions, and turned up around the bead cores 15 to form two turned up portion and one main portion therebetween. For the carcass cords, the above-mentioned Embodiment 3 is used.

Between the turned up portion and main portion in each bead portion 14 is provided with a rubber bead apex 16.

The belt 17 comprises at least two plies of parallel cords, wherein the cords of one ply cross the cords of the other ply. For the belt cords, the above-mentioned Embodiment 1 or 2 is used.

Each bead portion 14 is provided with a bead reinforcing layer G. The layer G is composed of a single ply of parallel cords. For the bead reinforcing cords, the above-mentioned Embodiment 4 is used. In FIG. 13, the layer G extends along the axially outside of the carcass ply turned up portion.

What is claimed is:

1. A steel cord formed by twisting a plurality of bunches of zigzag filaments together at a twisting pitch (Pc), each said bunch formed by twisting zigzag filaments together at a twisting pitch (Pf), each said zigzag filament being zigzaged two-dimensionally or in a plane by a zigzag pitch length (Pw) and a zigzag wave height (h) and being made up of straight segments each extending between zigzag peak points, said zigzag filaments including at least two kinds of zigzag filaments having different zigzag pitch lengths (Pw), the zigzag pitch length (Pw) and zigzag wave height (h) of each said zigzag filament being constant along the longitudinal direction thereof, each said bunch made up of at least two kinds of zigzag filaments, the number of the filaments in each bunch being 2 or 3, the total number of the filaments being 8 to 10, said zigzag filaments having a diameter (d) of 0.30 to 0.45 mm, the twisting pitch (Pc) being 10 to 40 mm, the twisting pitch (Pf) being 3 to 20 times the twisting pitch (Pc), the zigzag pitch length (Pw) being 5.0 to 30.0 times the diameter (d), the zigzag wave height (h) being 0.2 to 3.0 times the diameter (d), the product of the diameter (d) and height (h) being in 0.014 to 0.028 times the pitch length (Pw).

2. A steel cord formed by twisting zigzag filaments together at a twisting pitch (Pc), each said zigzag filament being zigzaged two-dimensionally or in a plane by a zigzag pitch length (Pw) and a zigzag wave height (h) and being made up of straight segments each extending between zigzag peak points, said zigzag filaments including at least two kinds of zigzag filaments having different zigzag pitch lengths (Pw), the zigzag pitch length (Pw) and zigzag wave height (h) of each said zigzag filament being constant along the longitudinal direction thereof, the filaments being twisted together by changing their relative positions so that a central core is not formed by a specific filament and the lengths of all the filaments are substantially equal to each other, the number of all the filaments being 8 to 12, all the filaments having the same diameter (d) of 0.15 to 0.30 mm, the twist pitch (Pc) being 10 to 25 mm, the zigzag pitch length (Pw) being 10.0 to 35.0 times the diameter (d), the zigzag wave height (h) being 0.5 to 4.0 times the diameter (d), in each filament, the quotient (h/Pw) of the zigzag pitch length (Pw) and zigzag wave height (h) being 0.75 to 1.25 times h1/Pw1, wherein Pw1 is the minimum zigzag pitch and h1 is the zigzag wave height of the filament having said minimum zigzag pitch.

3. A steel cord composed of a filament bunch and a wrapping wire, said filament bunch being formed by twisting zigzag filaments, each said zigzag filament being zigzaged two-dimensionally or in a plane by a zigzag pitch length (Pw) and a zigzag wave height (h) and being made up of straight segments each extending between zigzag peak points, said zigzag filaments including at least two kinds of zigzag filaments having different zigzag pitch lengths (Pw), the zigzag pitch length (Pw) and zigzag wave height (h) of each said zigzag filament being constant along the longitudinal direction thereof, the filaments being twisted together by changing their relative positions so that a central core is not formed by a specific filament and the lengths of all the filaments are substantially equal to each other, the number of all the filaments being 9, all the filaments having a diameter (d) of 0.17 to 0.25 mm, the twist pitch (Pc) being 10 to 20 mm, the zigzag pitch length (Pw) being 10.0 to 35.0 times the diameter (d), the zigzag wave height (h) being 0.5 to 4.0 times the diameter (d), in each filament, the quotient (h/Pw) of the zigzag pitch length (Pw) and zigzag wave height (h) being 0.75 to 1.25 times

* * * * *